US006729235B2

(12) United States Patent
Kerr

(10) Patent No.: US 6,729,235 B2
(45) Date of Patent: May 4, 2004

(54) IMAGING APPARATUS AND IMAGING DRUM HAVING MATERIAL CLAMP

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/845,145

(22) Filed: Apr. 30, 2001

(65) Prior Publication Data

US 2002/0191995 A1 Dec. 19, 2002

(51) Int. Cl.7 .......................... B41F 27/12; H04N 1/08

(52) U.S. Cl. .......................... 101/415.1; 101/389.1; 101/409; 399/304; 346/138; 271/277

(58) Field of Search .......................... 101/382.1, 389.1, 101/378, 409, 410, 415.1, 246; 399/304, 305; 271/275, 276, 277; 347/262, 264, 219, 220; 346/132, 138

(56) References Cited

U.S. PATENT DOCUMENTS

| | | | | | |
|---|---|---|---|---|---|
| 2,145,520 | A | | 1/1939 | McFarlane | 270/56 |
| 2,231,291 | A | | 2/1941 | Morrison | 101/415.1 |
| 2,730,949 | A | | 1/1956 | Mitchell | 101/415.1 |
| 2,999,453 | A | | 9/1961 | Roberts | 101/389.1 |
| 3,191,530 | A | | 6/1965 | Fath et al. | 101/247 |
| 3,438,324 | A | | 4/1969 | Meade et al. | 101/378 |
| 3,595,567 | A | | 7/1971 | Lee et al. | 101/247 |
| 4,127,265 | A | | 11/1978 | Wirz et al. | 101/409 |
| 4,250,810 | A | * | 2/1981 | Fowler et al. | 101/410 |
| 4,505,199 | A | | 3/1985 | Hasegawa et al. | 101/415.1 |
| 4,528,906 | A | | 7/1985 | Hasegawa | 101/415.1 |
| 4,587,900 | A | | 5/1986 | Oshio | 101/389.1 |
| 4,903,957 | A | | 2/1990 | Binder et al. | |
| 5,184,554 | A | * | 2/1993 | Merkel et al. | 101/415.1 |
| 5,200,708 | A | | 4/1993 | Morris, Jr. et al. | 330/124 R |
| 5,218,379 | A | | 6/1993 | Schmitt et al. | |
| 5,268,708 | A | | 12/1993 | Harshbarger et al. | |
| 5,291,260 | A | * | 3/1994 | Johnson et al. | 399/305 |
| 5,333,547 | A | | 8/1994 | Pfisterer et al. | |
| 5,473,983 | A | * | 12/1995 | Maul | 101/217 |
| 5,479,859 | A | | 1/1996 | Lindner et al. | 101/415.1 |
| 5,518,231 | A | * | 5/1996 | Reddy | 271/277 |
| 5,678,486 | A | | 10/1997 | Bachmeir et al. | 101/409 |
| 5,992,325 | A | | 11/1999 | Schumann et al. | 101/477 |
| 6,014,162 | A | | 1/2000 | Kerr | 347/262 |
| 6,048,297 | A | * | 4/2000 | Lange et al. | 493/424 |
| 6,454,255 | B1 | * | 9/2002 | Allen et al. | 271/176 |

FOREIGN PATENT DOCUMENTS

| | | | |
|---|---|---|---|
| EP | 0 340 925 | | 11/1989 |
| JP | 62-140952 | * | 6/1987 |
| JP | 3-279151 | * | 12/1991 |
| WO | WO 99/42290 | | 8/1999 |

* cited by examiner

*Primary Examiner*—Leslie J. Evanisko
(74) *Attorney, Agent, or Firm*—Roland R. Schindler, II

(57) ABSTRACT

An imaging drum assembly is provided for use in an imaging apparatus for forming images on sheet material. The imaging drum assembly comprises a rotatable imaging drum having an outer surface adapted to attract sheet material to the imaging drum. A material clamp is mounted to the drum and has a retainer positioning a retaining surface radially outward of the outer surface and forming a space therebetween. A slide is movable positioned within the space between an outer radial position where outward radial movement of the slide is blocked by the retaining surface and an inner radial position distant from the retaining surface. A biasing member urges the slide toward the outer radial position.

76 Claims, 20 Drawing Sheets

IMAGING APPARATUS AND IMAGING DRUM HAVING MATERIAL CLAMP

FIELD OF THE INVENTION

This invention relates to an imaging apparatus having an imaging drum to movably position sheet material such as thermal imaging material, dye donor sheets and direct writing plates during image formation. More specifically the present invention relates to mechanisms for loading, holding and releasing sheet material on an imaging drum.

BACKGROUND OF THE INVENTION

In the art of image generation it is often necessary to form an image on a sheet material such as a thermal media or a plate. Typically the sheet material is secured to an imaging drum and the imaging drum is rotated while a print head forms an image on the material. This can be done by transferring dye or ink to a sheet of material or by modifying the sheet of material. The task of attaching sheet material to the vacuum imaging drum is often rigorous because it requires precise positioning of the sheet material on the imaging drum. Once that sheet material is properly positioned on the drum it is necessary to hold the sheet material in place during imaging operations. Various mechanisms are known in the art to help secure sheet material such as thermal media, dye donor materials and direct write plates to an imaging drum.

For example, it is known use mechanical clamping mechanisms located at the outer surface of the drum. Such mechanical clamping mechanisms must be robust enough to resist the forces generated by the high speed rotation of the drum. These mechanisms can be hand actuated or they can be automatically actuated as is shown in U.S. Pat. No. 5,678,486. Such mechanisms are often complex, and have a clamping force that does not adaptively increase with the speed of drum rotation.

It is also known to temporarily fix the media and direct write plates onto the outer surface of the drum using magnets. These magnets are attached on top of the media or direct write plates and the force of the magnetic attraction between the magnet and the outer surface holds the media or direct write plates in contact with the drum. It will be appreciated that the magnetic attraction between the magnet and the outer surface must provide sufficient magnetic attraction to resist the centrifugal force of the drum as it rotates. Because the centrifugal force increases with drum rotation speed, it is necessary to use more powerful magnets to secure the media to the drum in order to withstand the centrifugal force created by increased rotational speed. It will be recognized that a point is reached where it becomes impractical to use magnets that have sufficient attractive force to withstand the aforementioned centrifugal force.

In commonly assigned U.S. Pat. No. 5,268,708 a dual chamber vacuum imaging drum is used to help controllably position the dye donor media and the thermal media on the surface of an imaging drum. One chamber applies vacuum that holds the lead edge of the dye donor material. Another chamber controls vacuum which holds the trail edge of the thermal print media to the vacuum in imaging drum. With this arrangement, loading a sheet of thermal print media and dye donor material requires that the image processing apparatus feed the lead edge of the thermal print media and dye donor material into position just past the vacuum ports controlled by the respective valve chamber. Then vacuum is applied, gripping the lead edge of the dye donor materials against the vacuum imaging drum surface. Unloading the dye donor material or the thermal print media requires the removal of vacuum from the same chamber so that in edge of the thermal print media or the dye donor material are freed in project out from the surface of the vacuum imaging drum. The image processing apparatus deposits an articulating skive into the path of the free edge of the donor material to lift the edge further and feed the dye donor material to a waist bin or output tray.

Thus, while the presently known and utilized mechanisms for attaching sheets of material to an imaging drum of an image processing apparatus are commercially viable, a need exists for an imaging drum having an improved mechanism for securing sheet material to a vacuum imaging drum. Further, a need exists for an imaging drum that can secure sheet material even at high rates of drum rotation.

SUMMARY OF THE INVENTION

According to a feature of the present invention, an imaging apparatus is provided for forming images on sheet material. The imaging assembly comprises a print head for forming images on the sheets and an imaging drum having an outer surface. A motor is also provided for rotating the imaging drum. A material clamp is mounted to the imaging drum having a retainer positioning a retaining surface radially outward of the outer surface and forming a space therebetween. A slide is movable within the space between an outer radial position where outward radial movement of the slide is blocked by the retaining surface and an inner radial position distant from the retaining surface. A magnet is provided having a magnetic field biases the slide toward the outer radial position. Rotation of the drum creates centrifugal force that further biases the slide toward the outer radial position.

According to another embodiment of the present invention, an imaging drum assembly is provided for use in an imaging apparatus for forming images on sheet material. The imaging drum assembly comprises a rotatable imaging drum having an outer surface adapted to attract material to the drum. A material clamp mounted to the drum having a retainer positioning a retaining surface radially outward of the outer surface and forming a space therebetween, A slide is movable within the space between an outer radial position where outward radial movement of the slide is blocked by the retaining surface and an inner radial position distant from the retaining surface. Rotation of the drum creates centrifugal force that biases the slide toward the outer radial position.

According to a further embodiment of the present invention, an imaging drum assembly is provided for use in an imaging apparatus for forming images on sheet material. The imaging drum assembly comprises a rotatable imaging drum having an outer surface adapted to attract sheet material to the imaging drum. A material clamp is mounted to the drum and has a retainer positioning a retaining surface radially outward of the outer surface and forming a space therebetween. A slide is movable positioned within the space between an outer radial position where outward radial movement of the slide is blocked by the retaining surface and an inner radial position distant from the retaining surface. A biasing member urges the slide toward the outer radial position.

DETAILED DESCRIPTION OF THE INVENTION

Figure 1:
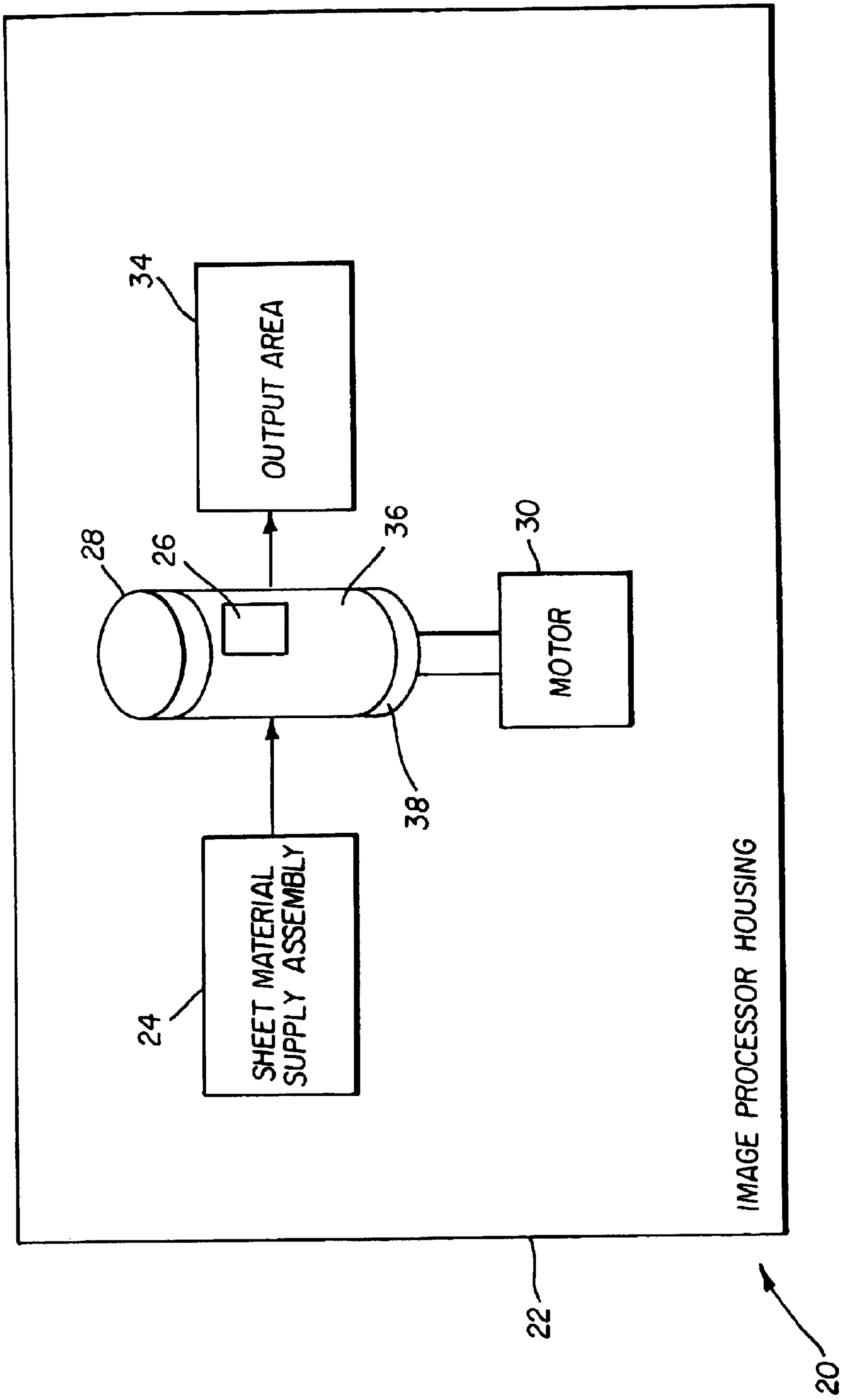
FIG. 1 is a schematic view of an image processing apparatus of the present invention.

Referring to FIG. 1, there is illustrated an image processing apparatus 20 according to the present invention. The image processing apparatus 20 is comprised of a housing 22, sheet material supply assembly 24; a print head 26; an imaging drum 28, a motor 30 and an output area 34. The image processing apparatus 20 is arranged to form an image on sheet material 36.

The operation of image processing apparatus 20 comprises transporting sheet material 36 to imaging drum 28, registering sheet material 36 on drum 28, wrapping sheet material 36 around drum 28, and securing sheet material 36 on imaging drum 28. During printing, motor 30 rotates drum 28 to move sheet material 36 past print head 26. Print head 26 forms an image on sheet material 36. After an image has been written on sheet material 36, sheet material 36 is transported to output area 34. Sheet material 36 can comprise a thermal transfer media, a dye donor sheet, a direct write plate or other forms of sheet material on which images can be formed.

Figure 2A:
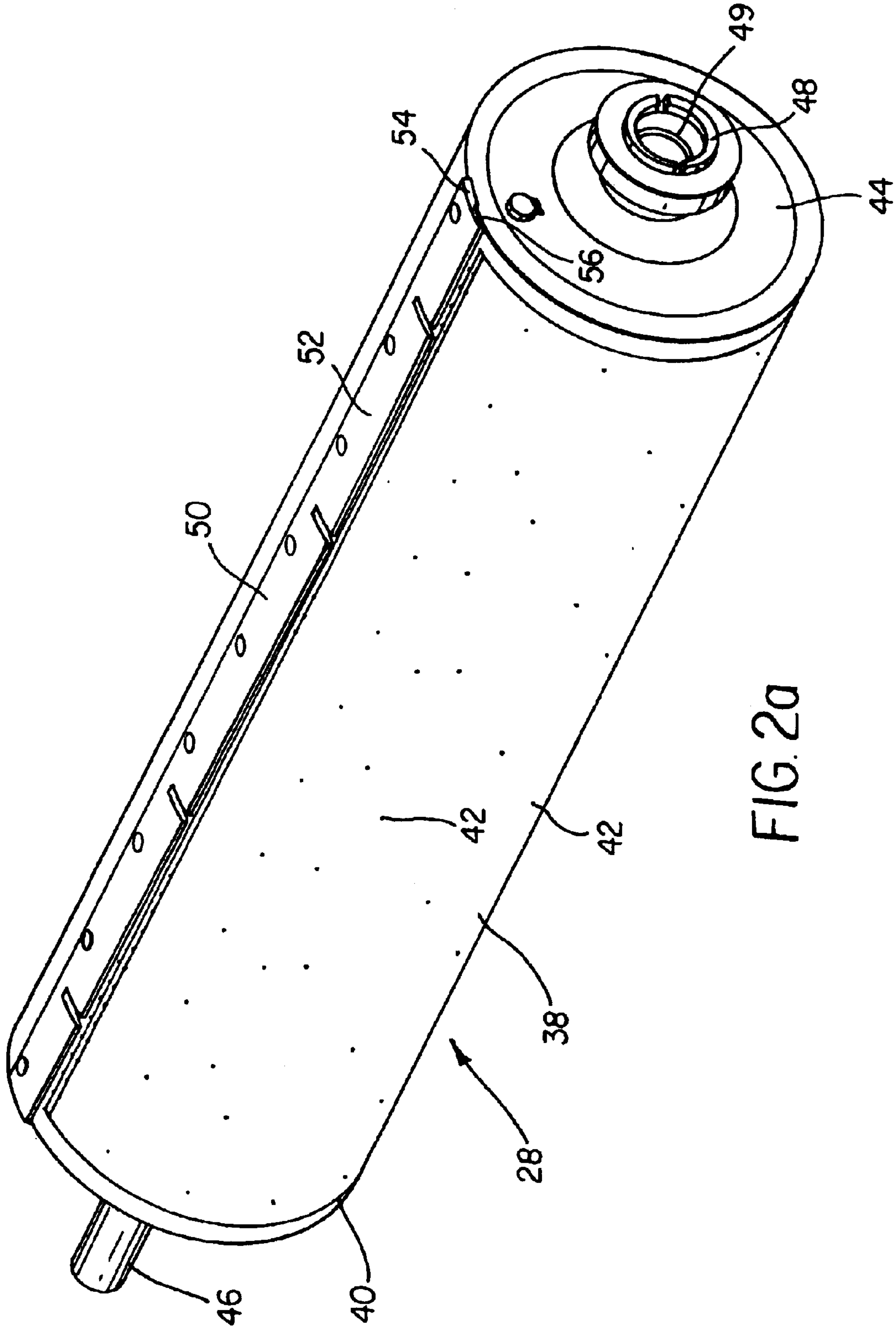
FIG. 2*a* is perspective view of the imaging drum of the present invention.
Figure 2B:
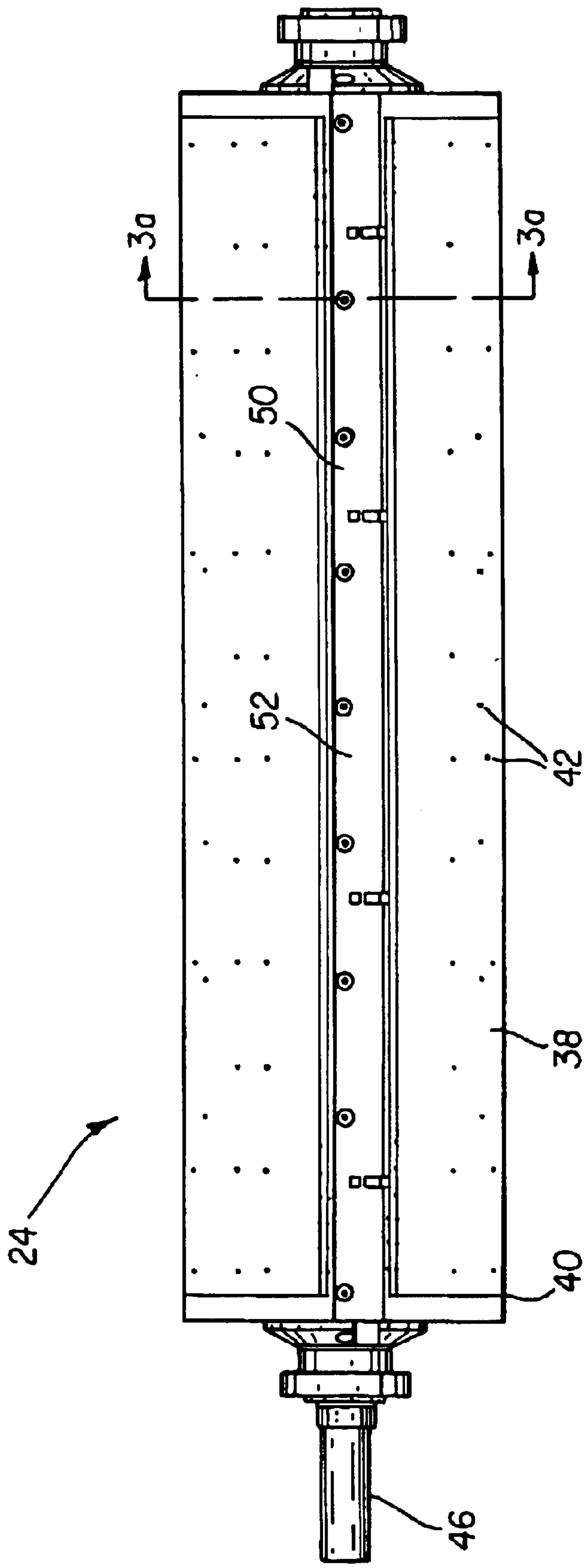
FIG. 2*b* is top view of the imaging drum of the present invention.

FIGS. 2*a* and 2*b* show, respectively a perspective view and a top view of one embodiment of an imaging drum 28 of the present invention. Imaging drum 28 comprises a cylindrical shaped imaging drum outer surface 38, which can, for example, be manufactured from a length of extruded aluminum tubing. In the embodiment of imaging drum 28 shown in FIGS. 2*a* and 2*b* and shown in other embodiments, imaging drum 28 is adapted to use a vacuum to assist in loading, holding, and unloading the sheet material 36. However, it is not necessary to use vacuum to provide such assistance. In this regard, imaging drum 28 can be adapted to use other attractive means such as electrostatic attraction or other attractive forces known in the art to assist during loading, holding and unloading sheet material. Further, imaging drum 28 of the present invention can be used without such assistance simply by holding sheet material 36 using a material clamp 50 to be disclosed hereinafter.

In FIGS. 2*a* and 2*b*, imaging drum 28 is shown provided with a plurality of vacuum grooves 40 on outer surface 38 of imaging drum 28 and vacuum holes 42 which extend through the vacuum drum outer surface 38. Vacuum holes 42 and vacuum grooves 40 allow a vacuum to be applied through a hollowed-out interior portion (not shown) of imaging drum 28 for supporting and maintaining the position of sheet material 36 on imaging drum 28.

Vacuum imaging drum 28 has two ends closed by a vacuum end plate 44, and a drive end plate (not shown). The drive end plate is provided with a centrally disposed drive spindle 46, which extends outwardly. Vacuum end plate 44 is provided with a centrally disposed vacuum spindle 48, which extends outwardly therefrom. Drive spindle 46 is connected to a motor 30. Motor 30 is fixed to housing 22 and provides a reversible, variable drive motor for rotating imaging drum 28. Vacuum spindle 48 is provided with a central vacuum opening 49. Vacuum opening 49 is connected to a vacuum blower (not shown) which provides the vacuum imaging drum 28 during the loading, scanning and unloading of sheet media 36.

FIGS. 2*a* and 2*b* also show a retainer 52 fixed to imaging drum 28. Retainer 52 includes a boss 54 and a retaining surface 56. Boss 54 is fixed to drum 28 and extends radially outward of outer surface 38. Boss 54 holds retaining surface 56 in a position radially outward of outer surface 38.

Figure 3A:
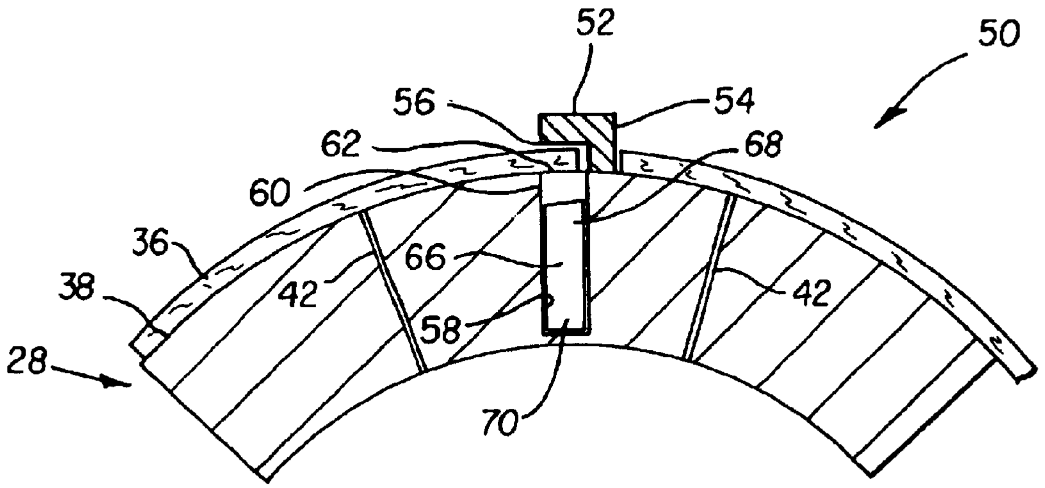
FIG. 3*a* shows a partial cross-section view of an embodiment of the present invention.

FIG. 3*a* shows a partial cross section view of drum 28 and material clamp 50. As is shown in FIG. 3*a*, imaging drum 28 also comprises a recess 58 in outer surface 38. Retaining surface 56 is positioned radially outward of recesses 58. Recess 58 has an outer end 60 defining an opening 62 in outer surface 38 and an inner end 64 separated from surface 38. A slide 66 is slidable in recess 58.

Figure 3B:
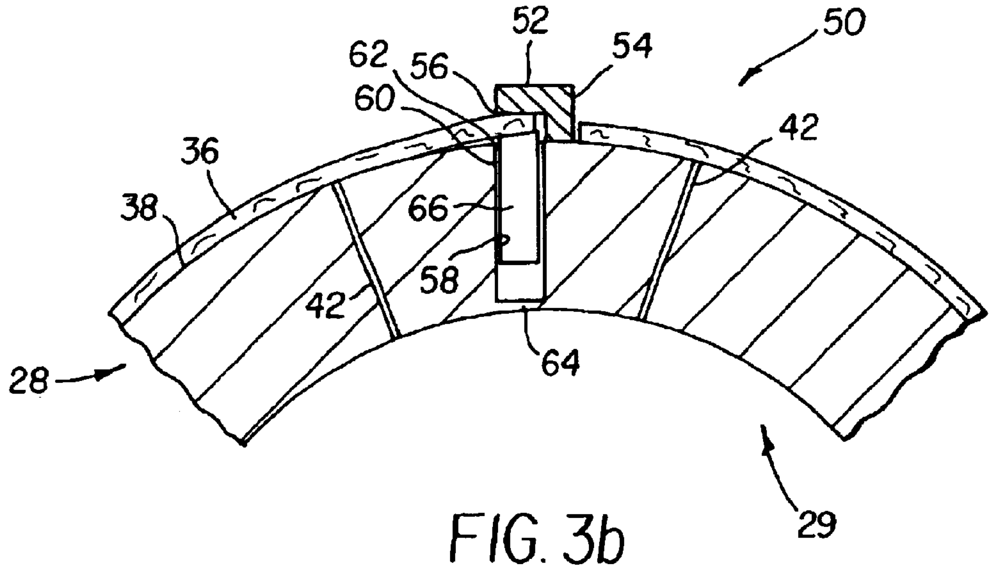
FIG. 3*b* shows a partial cross-section view of an embodiment of the present invention.

A first embodiment of the present invention is shown in FIGS. 3*a* and 3*b*. FIG. 3*a* shows the material clamp 50 with sheet material 36 is loaded between outer surface 38 and retaining surface 56 (FIG. 3*a*). In this embodiment, vacuum is applied to hollowed-out interior portion 29 of drum 28 and serves to hold sheet material 36 to outer surface 38. However, as motor 30 begins to rotate drum 28, centrifugal force biases slide 66 toward the outer radial position. Slide 66 advances to contact sheet material 36 and to clamp sheet material 36 against retaining surface 56 (FIG. 3*b*). Thus, in this embodiment, the clamping force exerted by slide 66 and retaining surface 56 increases as the speed of rotation of drum 28 is increased. In this manner, it is possible to rotate imaging drum 28 at a higher speed or to reduce the amount of energy that must be expended by the vacuum during operation.

Figure 3C:
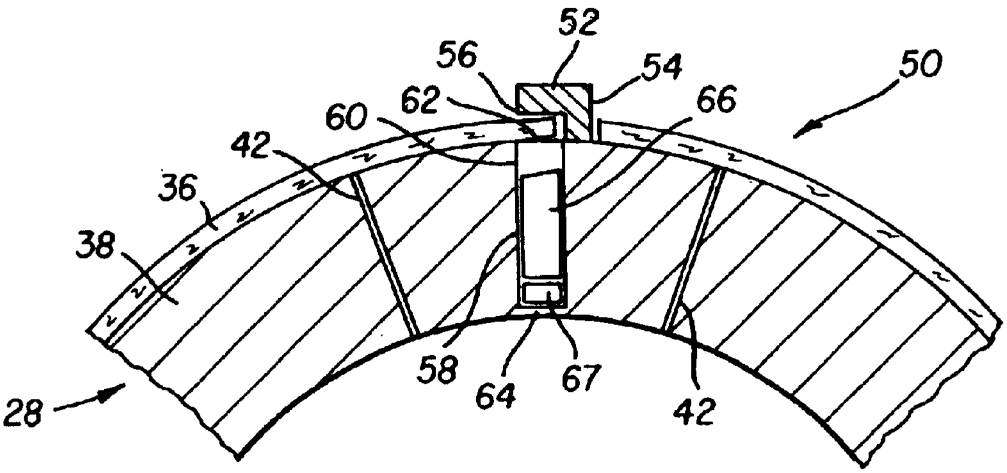
FIG. 3*c* shows a partial cross-section view of an embodiment of the present invention.
Figure 3D:
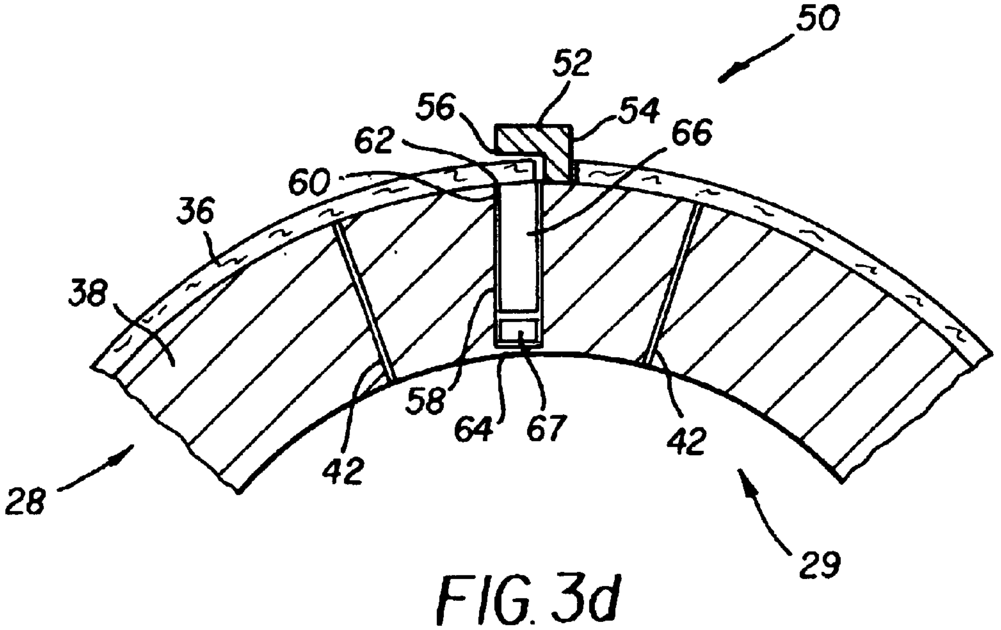
FIG. 3*d* shows a partial cross-section view of an embodiment of the present invention.

In other embodiments of the present invention, shown in FIGS. 3*c* and 3*d*, a material clamp 50 can be used to load, hold and unload sheet media 36 from the outer surface 38 of drum 28 without the need to adapt outer surface 28 to attract sheet media 36. In this embodiment, slide 66 is biased by a biasing member 67 toward the outward radial position. The motion of slide 66 is stopped at the outer radial position by engagement with retaining surface 56. When sheet material 36 is to be mounted to drum 28, a portion of sheet 36 is disposed between slide 66 and retaining surface 56. The bias acting on slide 66 provides a clamping force to hold sheet material 36 in material clamp 50. Slide 66 can be biased mechanically by biasing member 67 using a spring, pneumatic, thermal or electro-mechanical motors or solenoids.

Figure 4A:
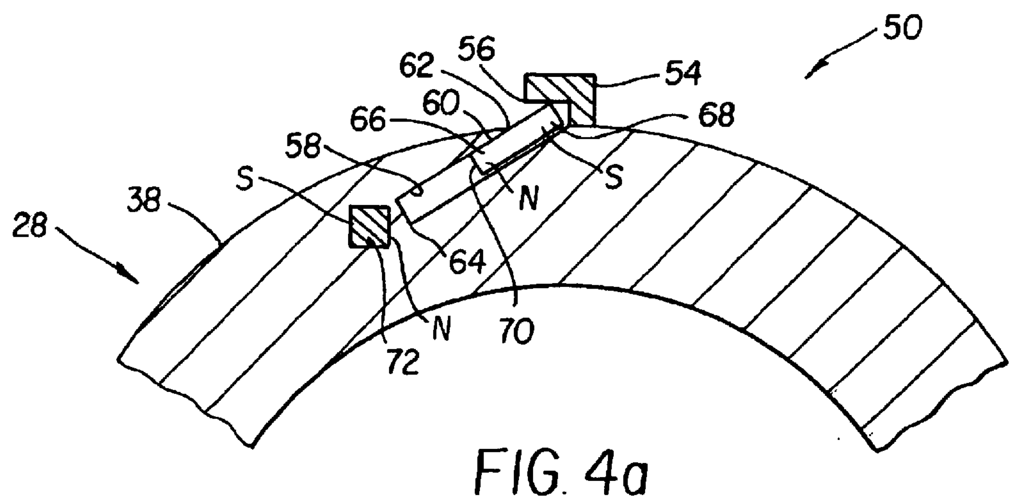
FIG. 4*a* is a partial cross-section view of an embodiment of the present invention.

In the embodiment shown in FIG. 4*a*, slide 66 has a first end 68 having a first magnetic polarity and a second end 70 having a second magnetic polarity. The magnetic polarities of slide 66 can be created by integrating component magnets (not shown) into slide 66 or by magnetizing slide 66. As shown in FIG. 4*a*, first end 68 is associated with a magnetic South pole S while second end 70 is associated with a magnetic North pole N.

A drum magnet 72 is positioned proximate to inner end 64. In FIG. 4*a*, drum magnet 72 also has a North magnetic pole N and a South magnetic pole S. However, the North magnetic pole N of drum magnet 72 is positioned to confront the North magnetic poles N of slide 66. Thus, drum magnet 72 repels slide 66. This biases slide 66 away from inner end 64 toward retaining surface 56. As is shown in FIG. 4*a*, where no sheet material 36 is installed on imaging drum 28, the magnetic biasing force is sufficient to propel slide 66 partially out of recess 58 to engage retaining surface 56.

It is not critical to the present invention whether a North magnetic pole or a South magnetic pole is used at a particular point in the embodiments of slide 66, drum magnet 72 or any other magnet discussed hereafter, provided that the magnetic poles of slide 66, drum magnet 72 or any other magnet discussed hereafter are arranged to produce the biases described. In this regard, the placement of the symbols N and S on any drawing herein are made by way of example and illustration only.

Figure 4B:
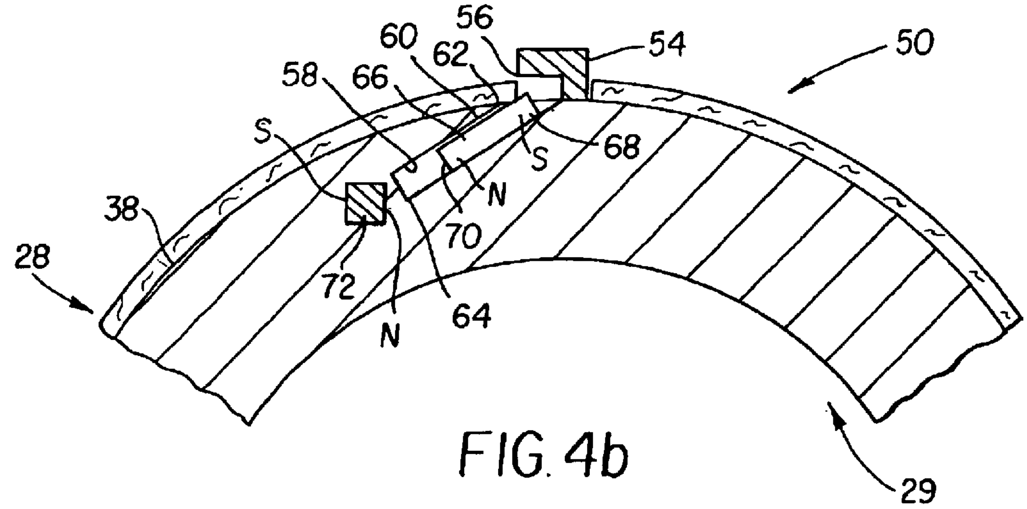
FIG. 4*b* is a partial cross-section view of an embodiment of the present invention.

FIG. 4*b* shows the operation of this embodiment when sheet material 36 is installed on imaging drum 28. As is shown in FIG. 4*b*, the sheet material 36 is fixed in material clamp 50 by inserting the sheet material 36 between outer surface 38 and retaining surface 56. This brings the sheet material 36 into contact with the first end 68 and causes slide 66 to be displaced into recess 58. This also causes the second end 70 of slide 66 to come into closer proximity to drum magnet 72. It will be appreciated that the magnetic repulsion between the drum magnet 72 and slide 66 increases as the separation between the second end 70 of slide 66 and drum magnet 72 decreases.

Figure 4C:
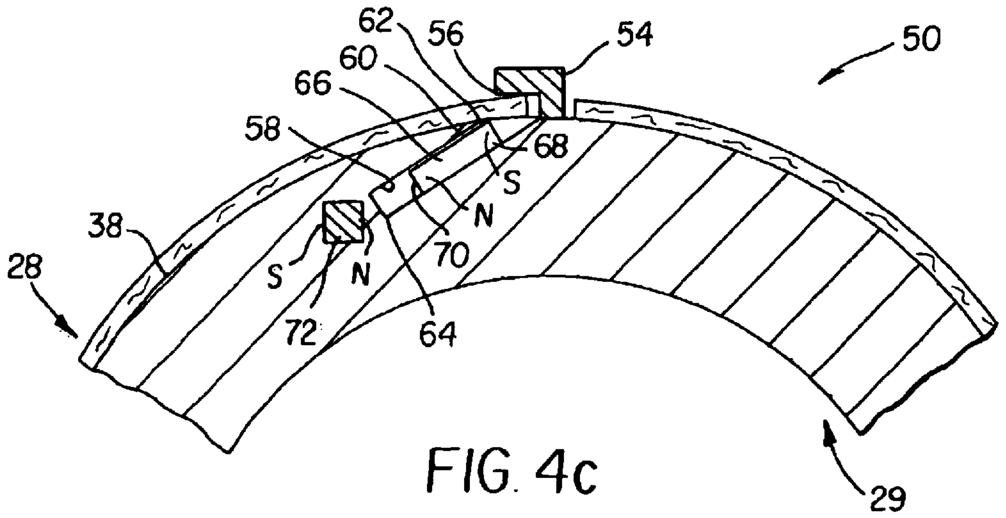
FIG. 4*c* is a partial cross-section view of an imaging drum of the present invention showing the material clamp wherein sheet material is partially installed in the material clamp.

As is shown in FIG. 4*c*, when the sheet material 36 is fully located in material clamp 50, the magnitude of the of biasing force between slide 66 and the drum magnet 72 reaches a high point. This biasing force is resisted by retaining surface 56, creating a clamping force to hold sheet material 36 in material clamp 50. Although the forgoing discussion has involved the operation of material clamp 50 upon insertion of a single sheet of material 36, the same principles of operation can be used to secure multiple sheets of material to imaging drum 28.

In one embodiment of the present invention, retaining surface 56 comprises a material that is magnetically attractive to the first magnetic polarity of first end 68 of slide 66. This magnetically attractive material can be comprised of a ferro-magnetic material such as an iron or steel material and can be comprised of a magnet having a magnetic polarity that is opposite to the magnetic polarity of the first end 68 of slide 66 and therefore attractive to slide 66. In the embodiment of FIGS. 4*a*–4*c*, this provides an additional biasing force to attract the slide 66 toward retaining surface 56.

Figure 5A:
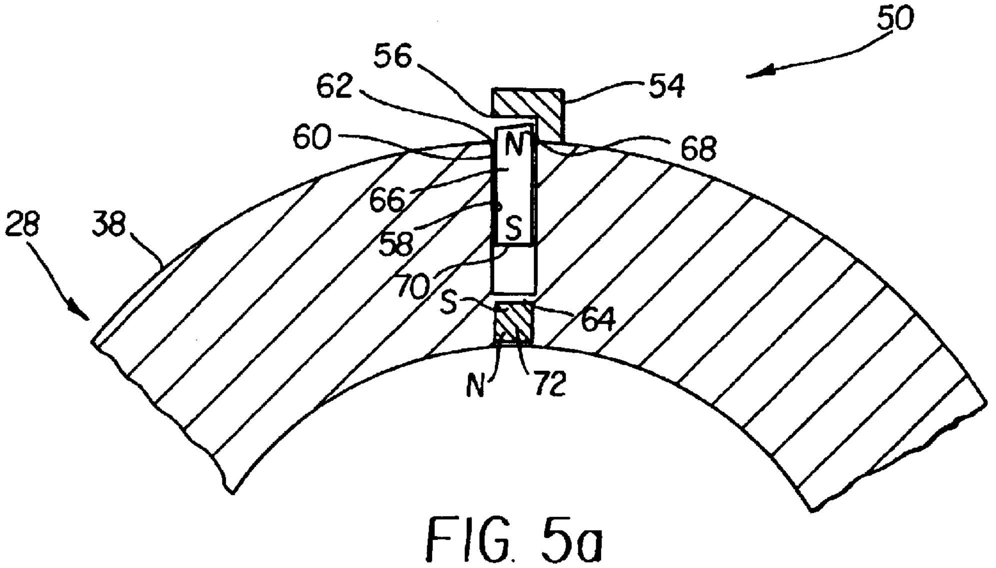
FIG. 5*a* is a partial cross-section view of an embodiment of an imaging drum of the present invention showing the material clamp.
Figure 5B:
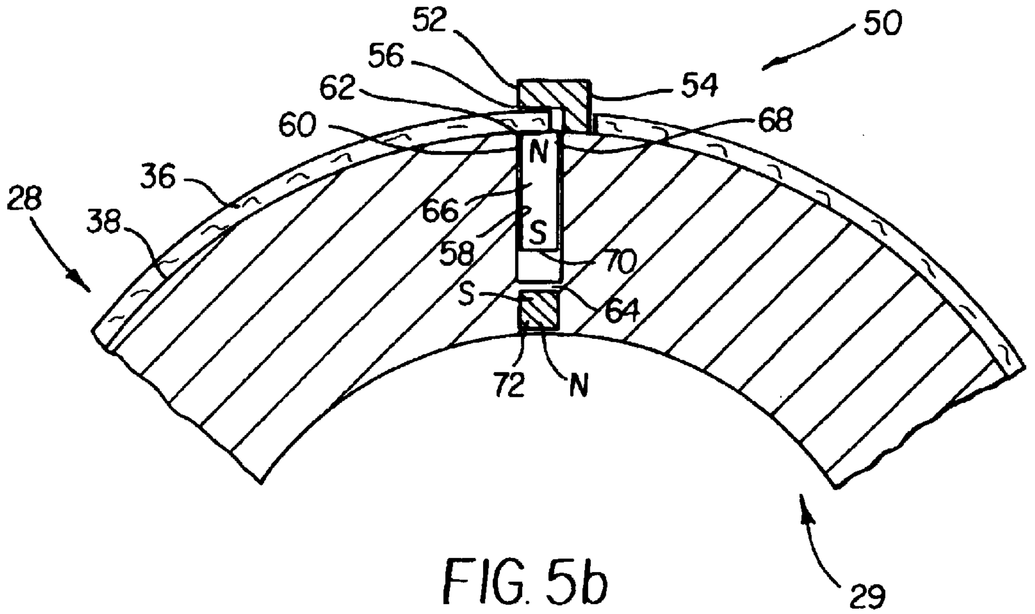
FIG. 5*b* is a partial cross-section view of an embodiment of an imaging drum of the present invention showing the magnetic clamp wherein sheet material is installed in the magnetic clamp.

In other embodiments of the present invention, drum 28 and material clamp 50 are arranged to use both centrifugal force and magnetic force to bias slide 66. One example of such an embodiment is shown in FIGS. 5*a* and 5*b*. As is shown in FIG. 5*a*, slide 66 is arranged for movement in a manner that is consistent with the centrifugal force generated by rotation of drum 28. Slide 66 also generates a magnetic field. This magnetic field is repelled by the magnetic field of drum magnet 72 to provide a magnetic force to bias slide 66 in the manner that is described above.

Thus this embodiment of the present invention provides the advantage of having two principal clamping forces. The first clamping force is the material clamping force that operates as described above. The second clamping force comes into being when motor 30 turns drum 28 and is generated by centrifugal force acting against slide 66. Slide 66 is free to move toward and away from the center of drum 28. Thus, as is shown in FIG. 5*b*, as drum 28 rotates, slide 66 is propelled toward retaining surface 56 by centrifugal force. Further, the rate of drum rotation increases, the centrifugal force increases concomitantly and, the clamping force exerted by slide 66 and retaining surface 56 against sheet material 38 also increases. Thus, in this embodiment, material clamp 50 automatically increases the clamping force acting on the sheet material 36 with increases in the speed of rotation of drum 28.

It may be beneficial to provide magnetic drum 28 with a material clamp 50 structure that will allow material clamp 50 to be operated in a "close" state to hold sheet material in material clamp 50 and in an "open" state to facilitate insertion and removal of sheet material 36 in material clamp 50.

In this regard, one embodiment of drum 28 of the present invention has a material clamp 50 that is transitioned from an "open" state to a "close" state by varying the intensity of the magnetic field that acts against magnetic slide 66 between a high level associated with the "close" state and a low level that is associated with the "open" state. In the "close" state, the intensity of the magnetic field that acts against the second pole of slide 66 is sufficient to fully bias slide 66 and to cause material clamp 50 to operate as described above. In contrast, in the "open" state, the intensity of the magnetic field that acts against the second pole of slide 66 is substantially attenuated or eliminated. This, in turn, substantially attenuates or eliminates the bias force urging slide 66 toward retaining surface 56, permitting the user to position sheet material 36 into material clamp 50 with little or no resistance. After the sheet material 36, is positioned into material clamp 50, material clamp 50 is returned to the "close" state to lock in the position of the sheet material 36 on the drum.

In the embodiment shown in FIGS. 5*a* and 5*b* first end 68 of slide 66 comprises an optional tapered lead-in surface to facilitate loading of sheet material 36.

Figure 6A:
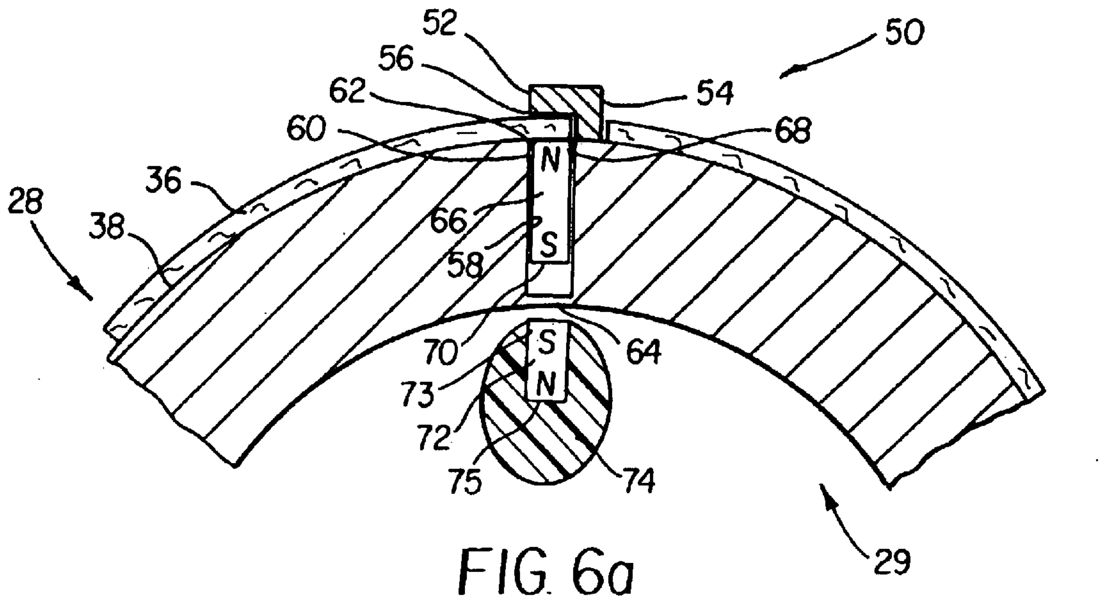
FIG. 6*a* is a partial cross-section view of an embodiment of an imaging drum of the present invention having a movable cam positioned to place the material clamp in a close state.
Figure 6B:
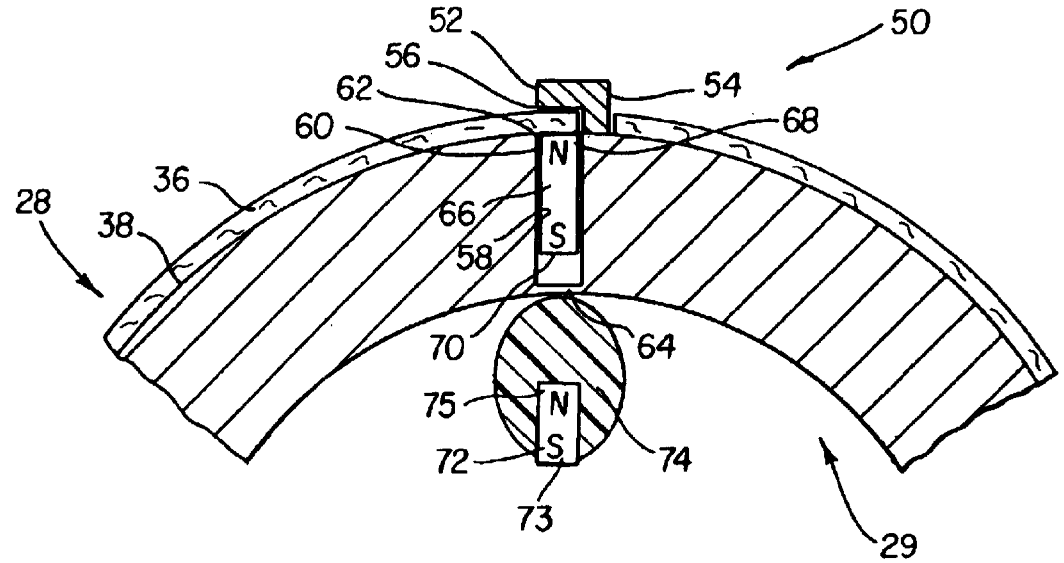
FIG. 6*b* is a second partial cross-section view of an embodiment of an imaging drum of the present invention having a movable cam positioned to place the clamp in an open state.

FIGS. 6*a* and 6*b*, show an embodiment of a drum 28 of the present invention having a material clamp 50 with a mechanical structure for attenuating the magnetic bias exerted by drum magnet 72 against slide 66 in order to transition material clamp 50 from the "open" state to the "close" state. In this embodiment, slide 66 is selectively repelled and attracted mechanically by varying the polarity of the magnetic field that acts against the second magnetic pole of slide 66. This is accomplished by physically moving the drum magnet 72 from a first position proximate to inner end 64 to a second position that is separate from the inner end 64. In this embodiment, drum magnet 72 is positioned in the first position when material clamp 50 is in the "close" state, and drum magnet 72 is moved to the second position when material clamp 50 is in the "open" state.

As shown in FIG. 6*a*, drum magnet 72 has a first magnetic pole that repels slide 66 at first end 73 and a second magnetic pole at second end 75. Drum magnet 72 is fixed to rotatable cam 74. When it is desired to place material clamp 50 in the "close" state, cam 74 positions first end 73 of drum magnet 72 proximate to inner end 64. This biases slide 66 away from first end 66 and toward retaining surface 56. When it is desired to place material clamp 50 in the "open" state, cam 74 is rotated to a position, shown in FIG. 6*b*, wherein first end 73 of drum magnet 72 is separated from inner end 64. It will be appreciated that other movable mechanical structures known to those having ordinary skill in the art can also be used to move drum magnet 72 from the first position to the second position.

Figure 6C:
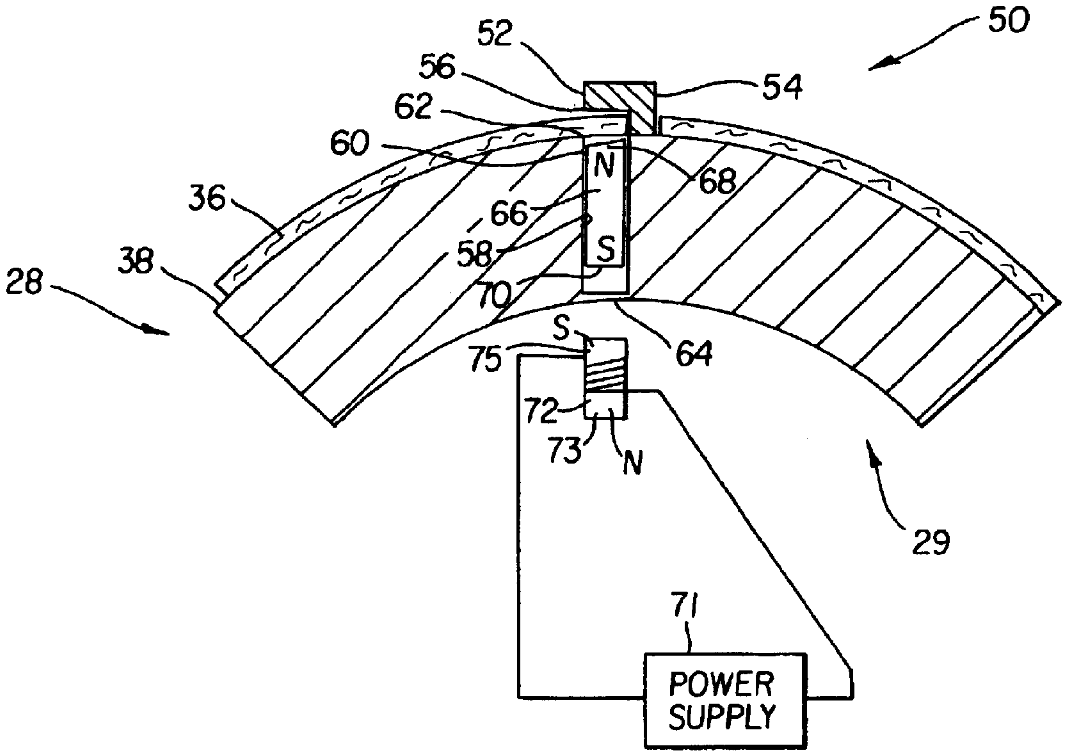
FIG. 6*c* shows a partial cross-section view of an embodiment of an imaging drum having an electromagnet.

In an alternative embodiment of the present invention shown in FIG. 6*c*, an electrical structure is used to attenuate the magnetic bias exerted by drum magnet 72 against slide 66 in order to transition clamp 50 from the "open" state to the "close" state. In this embodiment, drum magnet 72 comprises an electromagnet and imaging apparatus 10 further comprises an electromagnet power supply 71. Electromagnet power supply 71 is electrically connected to the electromagnet and supplies a reversible flow of current to the electromagnet. In this embodiment, the intensity of the magnetic field to which slide 66 is exposed is defined by the intensity of current flow through the electromagnet. Accordingly, when it is desired to place material clamp 50 in the "open" state, the flow of electric current through the electromagnet is stopped or substantially reduced. This eliminates or substantially reduces the magnetic bias urging slide 66 away toward retaining surface 56. When it is desired to place material clamp 50 in the "close" mode, the electromagnetic power supply causes current to flow in through the electromagnet. This causes drum magnet 72 to generate a magnetic field which, in turn, biases slide 66 toward retaining surface 56.

Material clamp 50 can also be transitioned from an "open" state to a "close" state by varying the he polarity of the magnetic field that acts against magnetic slide 66 between a repellant polarity that is associated with the "close state" and an attractive polarity that is associated with the "open" state.

Figure 7A:
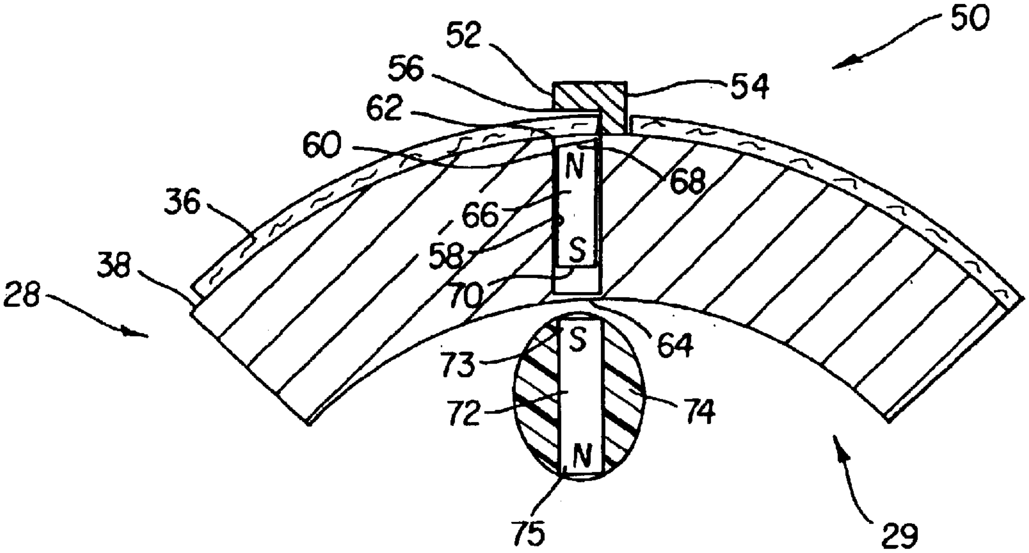
FIG. 7*a* is a partial cross-section view of an embodiment of an imaging drum of the present invention having a movable cam positioned to place the magnetic clamp in a close state.
Figure 7B:
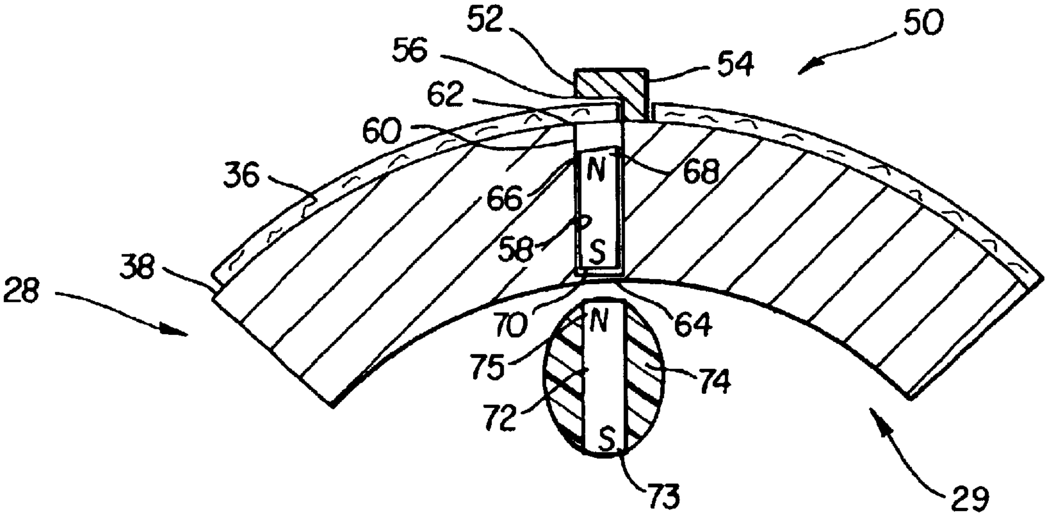
FIG. 7*b* is a partial cross-section view of an embodiment of an imaging drum of the present invention having a movable cam positioned to place the clamp in an open state.

FIGS. 7*a* and 7*b* show an embodiment of an imaging drum 28 of the present invention having a mechanical structure for reversing the polarity of the magnetic field that acts against slide 66 in order to transition clamp 50 from a "close" state to an "open" state. In this embodiment, drum magnet 72 is a bi-polar magnet having opposite magnetic polarities at different points on drum magnet 72. By physically moving the drum magnet 72 from a first position FIG. 7*a* wherein a repellant pole is proximate to inner end 64 to a second position FIG. 7*b* wherein an attractive magnetic pole is proximate to inner end 64, drum magnet 72 can be transitioned from the "close" state to the "open" state.

In this embodiment, drum magnet 72 has a magnetic pole that repels slide 66 at first end 73 and a second magnetic pole at second end 75 that attracts slide 66. Drum magnet 72 is fixed to rotatable cam 74. Rotatable cam 74 is rotatable between a first position, shown in FIG. 5*a* is in a position that is proximate to inner end 64 and a second position, shown in FIG. 7*b*, wherein second end 75 is positioned proximate to inner end 64. It will be appreciated that other movable mechanical structures known to those having ordinary skill in the art can also be used to move drum magnet 72 from the first position to the second position.

Figure 7C:
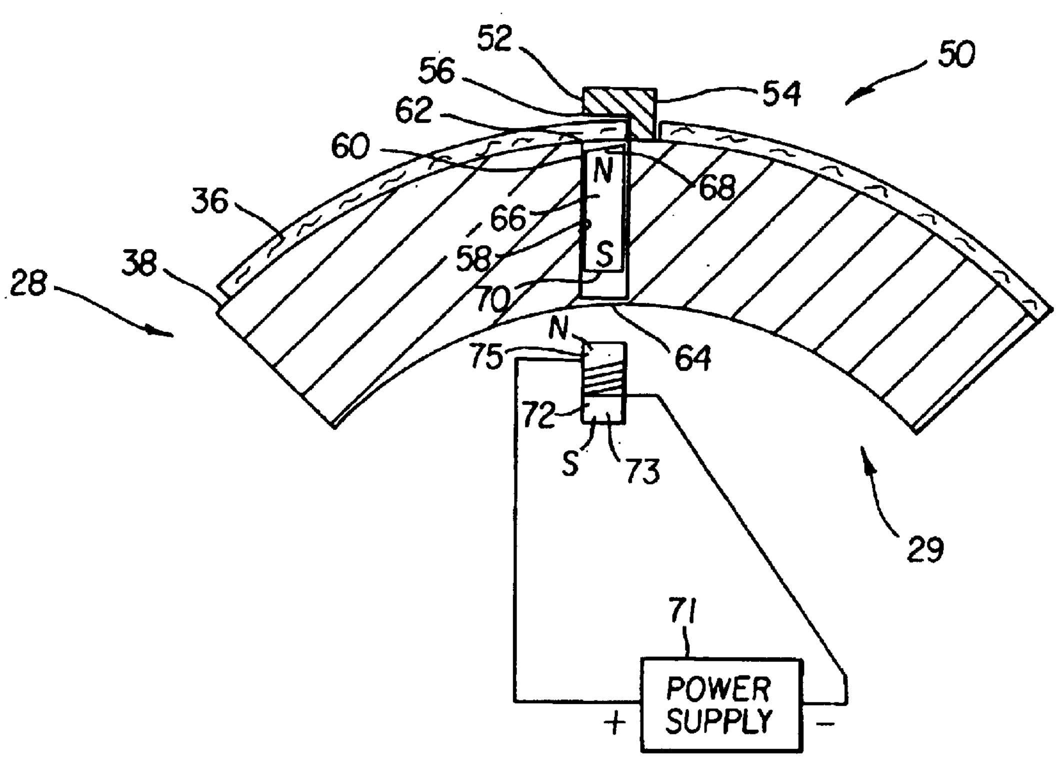
FIG. 7*c* is a partial cross-section view of an embodiment of an imaging drum of the present invention having a reversible electromagnet positioned to place the magnetic clamp in a close state.
Figure 7D:
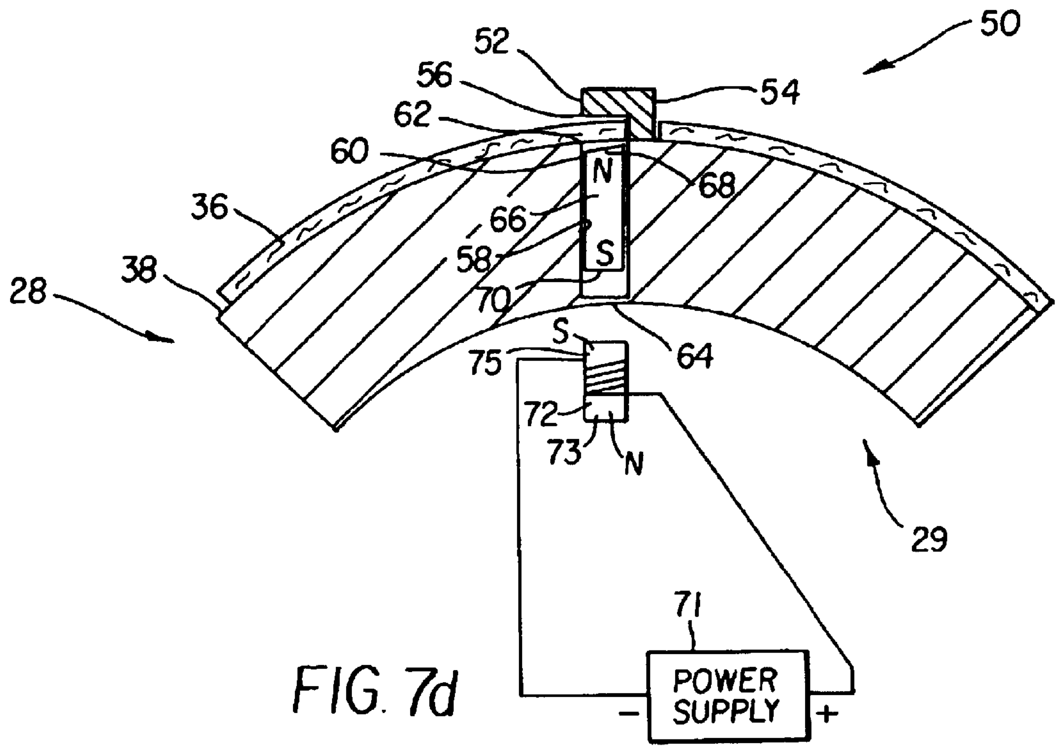
FIG. 7*d* is a partial cross-section view of an embodiment of an imaging drum of the present invention having a reversible electromagnet positioned to place the clamp in an open state.

FIGS. 7*c* and 7*d* show an alternative embodiment of the present invention wherein drum magnet 72 comprises an electromagnet connected to a reversible source of electricity as is seen in FIGS. 7*a* and 7*b*. The polarity of the electromagnet can be reversed by reversing the flow of current through the electromagnet.

Figure 8A:
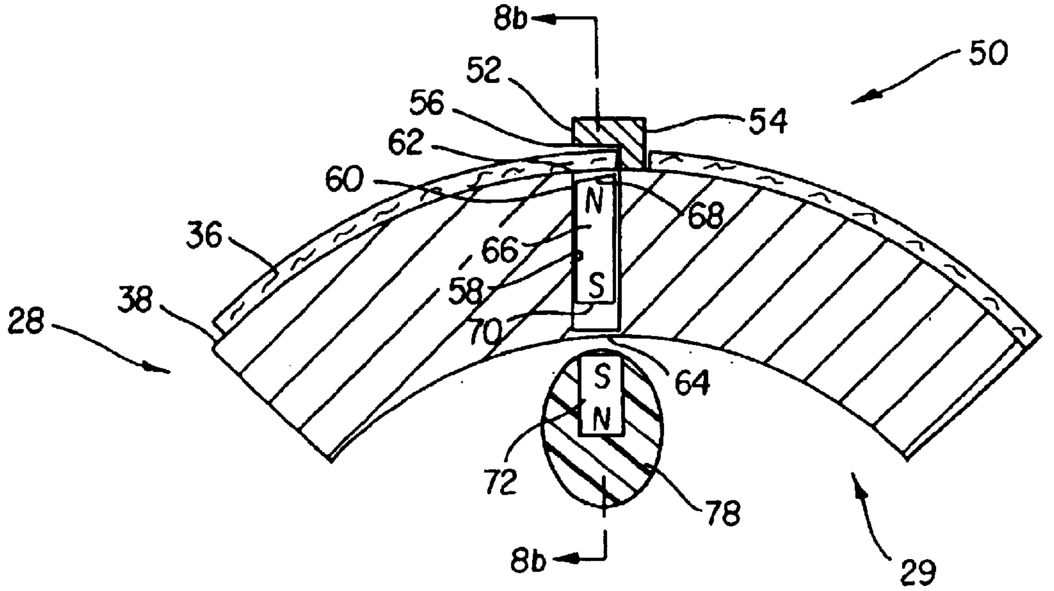
FIG. 8*a* is a partial cross-section view of an embodiment of n imaging drum of the present invention having a movable cam positioned to place the magnetic clamp in a close state.
Figure 8B:
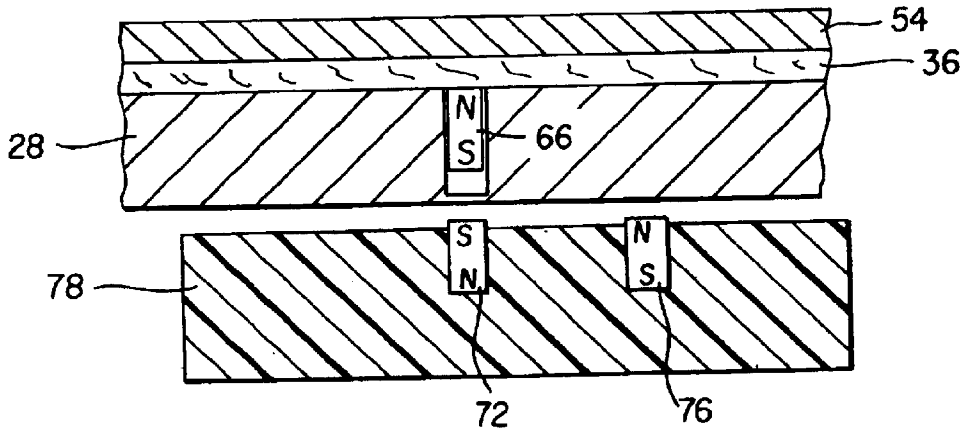
FIG. 8*b* is a second partial cross-section view of an embodiment of an imaging drum of the present invention having a movable cam positioned to place the clamp in a close state.
Figure 8C:
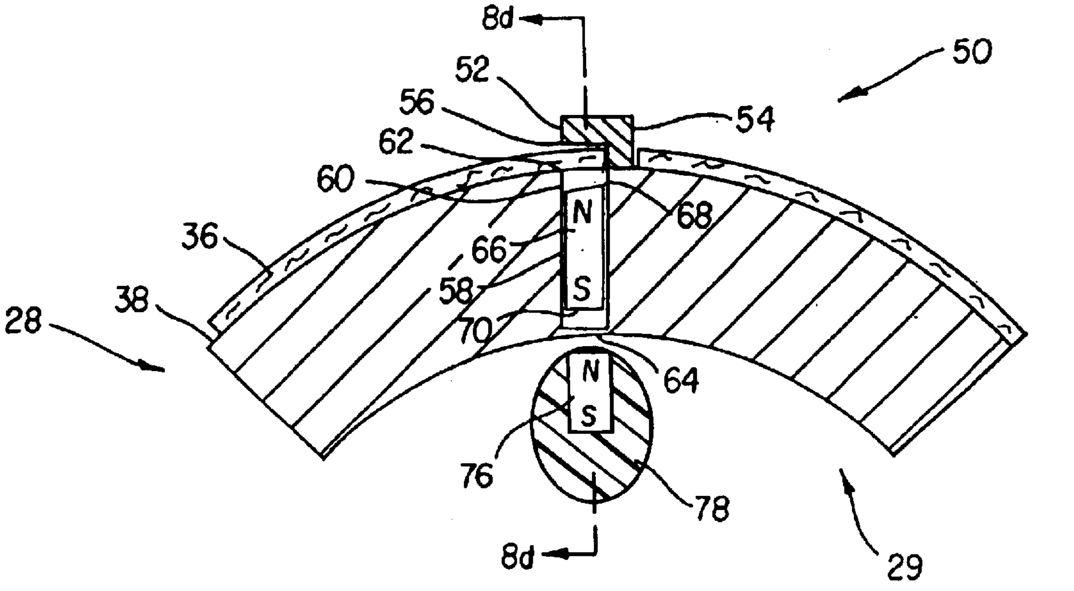
FIG. 8*c* shows an embodiment of the present invention using magnetic attraction between a retaining surface and a slide to provide clamping bias operated in an open state.
Figure 8D:
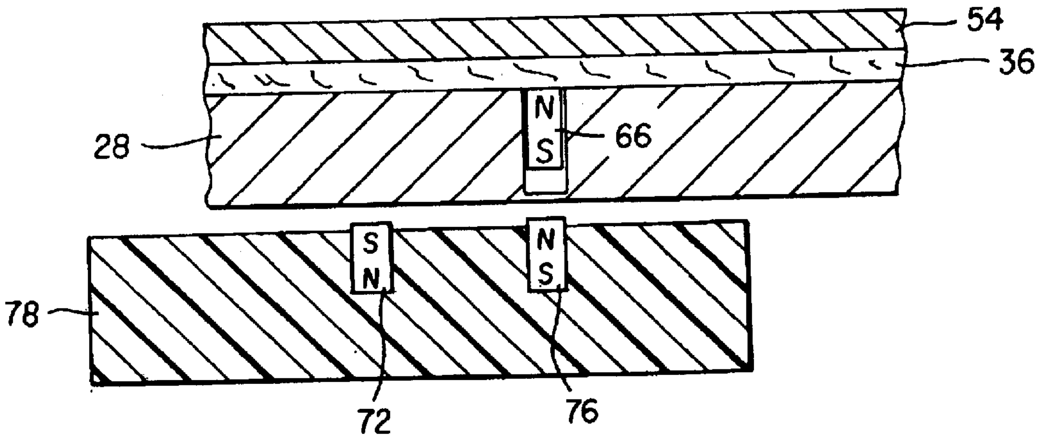
FIG. 8*d* shows an embodiment of the present invention using magnetic attraction between a retaining surface and a slide to provide clamping bias operated in an open state.

Another embodiment of drum 28 of the present invention, shown in FIGS. 8*a*–8*d*, uses a different mechanical structure for reversing the polarity of the magnetic field that acts against slide 66 in order to transition clamp 50 from a "close' state to an "open" state. As is shown in FIG. 8*a*, in this embodiment a slide bar 78 is also fixed to drum 28. Drum magnet 72 and a second drum magnet 76 are fixed to slide bar 78 and slide bar 78 is movable between a first position (FIGS. 8*a* and 8*b*) wherein drum magnet 72 is proximate to inner end 64 and a second position (FIGS. 8*c* and 8*d*) wherein second drum magnet 76 is positioned proximate to inner end 64. In the embodiment of FIGS. 8*a*–8*d*, drum magnet 72 confronts inner end 64 with a polarity that repels the second magnetic pole of slide 66 while drum magnet 76 confronts inner end 64 with a magnetic polarity that is attractive to the second magnetic pole of slide 66. Accordingly, in this embodiment, the polarity of the magnetic field acting against the second magnetic pole of slide 66 can be reversed by physically moving slide bar 78 from the first position to the second position. Other movable mechanical structures known to those having ordinary skill in the art can also be used to move slide bar 78 from the first position to the second position. It will also be appreciated that, a mass of magnetically attractive material such as iron or steel can be used in place of second drum magnet 76 on side bar 78.

Figure 9A:
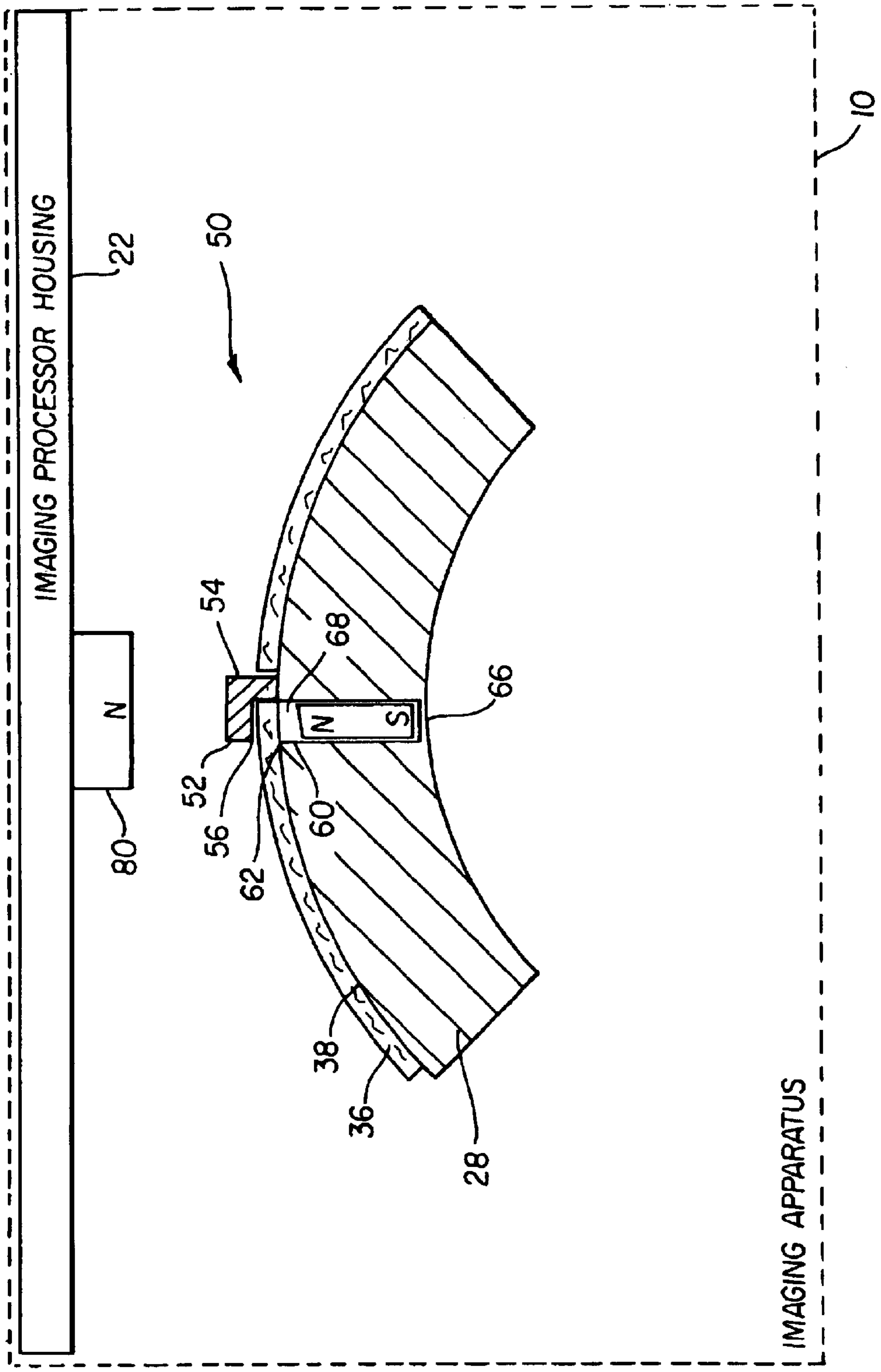
FIG. 9*a* shows and embodiment of the present invention having an electromagnet that is external to the drum, biasing the slide to the open position.
Figure 9B:
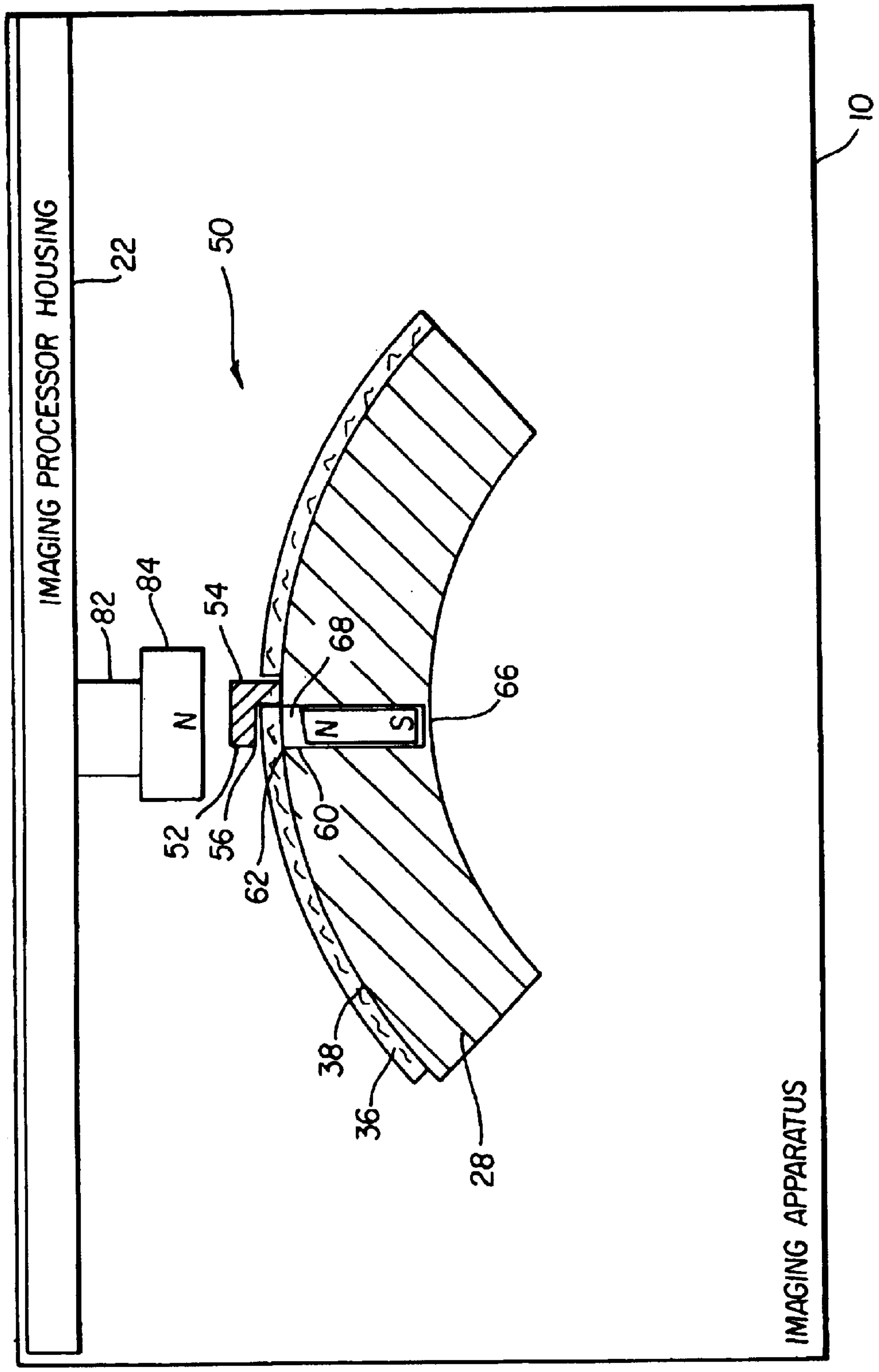
FIG. 9*b* shows an embodiment of the present invention having a moveable magnet to bias the slide in the open position.

Structures outside of imaging drum 28 can also be used to transition a material clamp 50 between an "open" state and a "close" state. As is shown in FIG. 9*a*, imaging apparatus 20 can comprise electromagnet 80 disposed proximate to imaging drum 28 for generating electromagnetic field that biases slide 66 away from retaining surface 56. As is shown in FIG. 9*b*, imaging apparatus 20 can also comprise mechanical actuator 82 such as a solenoid, a motor, or hydraulic, pneumatic or thermal piston or the like, for advancing a third magnet 84 proximate to imaging drum 28 for generating magnetic field to bias slide 66 away from retaining surface 56 to put magnet drum 28 in the "open" state. In this embodiment, clamp 50 is returned to the "close" state when actuator 82 retracts third magnet 84 to a position distal to clamp 50.

Figure 10:
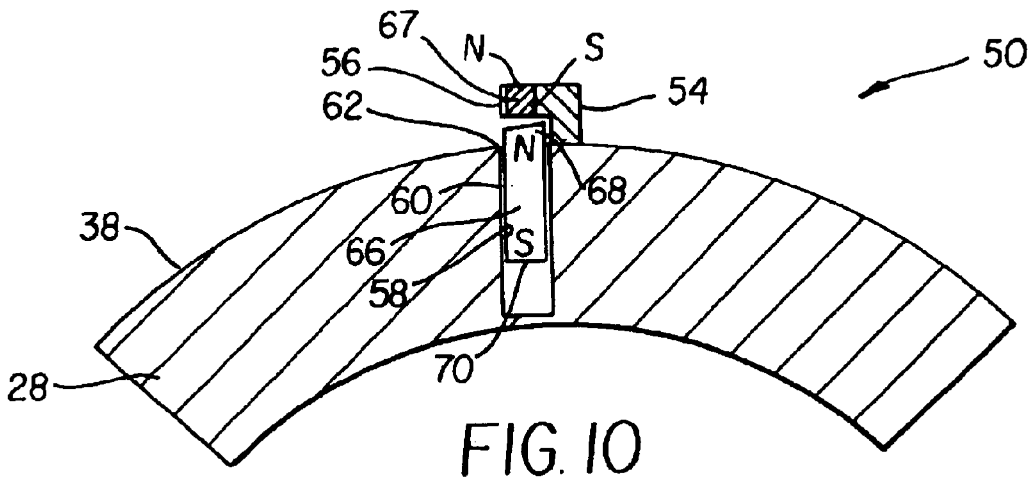
FIG. 10 shows a partial cross-section view of an imaging drum of the present invention showing an embodiment wherein magnetic attraction is used to bias the slide toward the retaining surface.

However, as is shown in FIG. 10, the present invention can be practiced using magnetic attraction between retaining surface 56 and first end 68 of slide 66 to provide primary clamping force for the material clamp. In this embodiment, retaining surface 56 comprises a material that is magnetically attractive to the first magnetic polarity of first end 68 of slide 66. This magnetically attractive material can comprise a simple ferro-magnetic magnetic material such as an iron or steel material and can also comprise a retaining surface magnet 67 such as a permanent magnet or an electro-magnet having a magnetic polarity that is opposite to the magnetic polarity of the first end 68 of slide 66 and therefore attractive to slide 66. As is shown in FIG. 10, the magnetic attraction between slide 66 and retaining surface 56 is defined to provide sufficient clamping force to hold sheet material 36. In this embodiment it is not necessary to use a drum magnet. However, a drum magnet can also be used in this embodiment to provide supplemental bias.

The embodiment of FIG. 10 can be operated in an "open" and "close" state. This can be accomplished by moving a permanent drum magnet 72 as is shown and described above in connection with the embodiments FIG. 6, 7, or 8. This can also be accomplished using an electro-magnet as is described above.

Figure 11A:
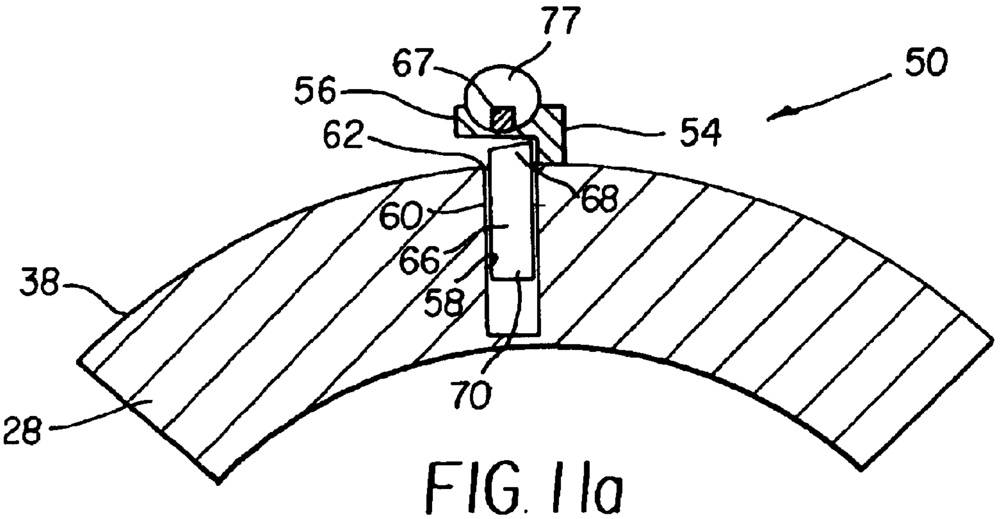
FIG. 11*a* shows a partial cross-section view of an imaging drum of the present invention wherein magnetic attraction is used to bias the slide toward the retaining surface and operated in a close state.
Figure 11B:
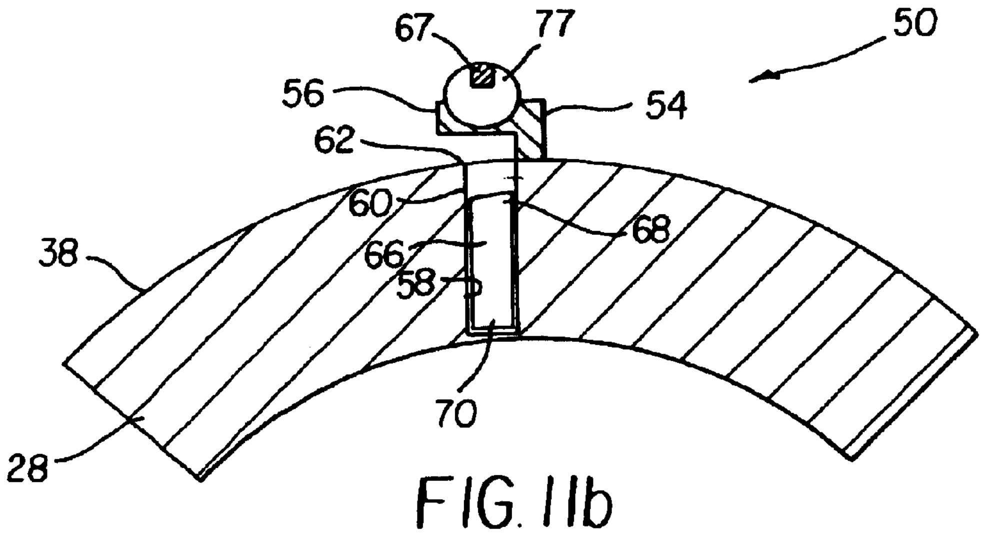
FIG. 11*b* shows a partial cross-section view of an imaging drum of the present invention wherein magnetic attraction is used to bias the slide toward the retaining surface and operated in an open state.

In the embodiment of the present invention using magnetic attraction between slide 66 and retaining surface 56 as the principal force biasing slide 66 toward retaining surface 56, slide 66 does not need be a source of a magnetic field. Instead, in this embodiment slide 66 can comprise any material that can be magnetically attracted by retaining surface 56.

Where slide 66 does not generate a magnetic field it is possible to transition clamp 50 from an open state to a close state by reducing the intensity of the magnetic field attracting slide 66 toward retaining surface 56. As is shown in FIG. 11*a*, a mechanical retainer cam can position retainer magnet 67 in a first position associated with the "open" state wherein retainer magnet 67 is proximate to first end 68 of slide 66 to maximize the magnetic attraction between retainer magnet 67 and slide 66. In the "close" state retainer cam 77 positions retainer magnet 67 at a position that is distal from first end 68 of slide 66 (FIG. 11*b*) in order to minimize the magnetic attraction between retainer magnet 67 and slide 66. Similarly, retainer magnet 67 can comprise an electromagnet that is electrically energized to attract slide 66 when clamp 66 is in the "open" state and that is electrically de-energized in the "close" state.

Figure 12:
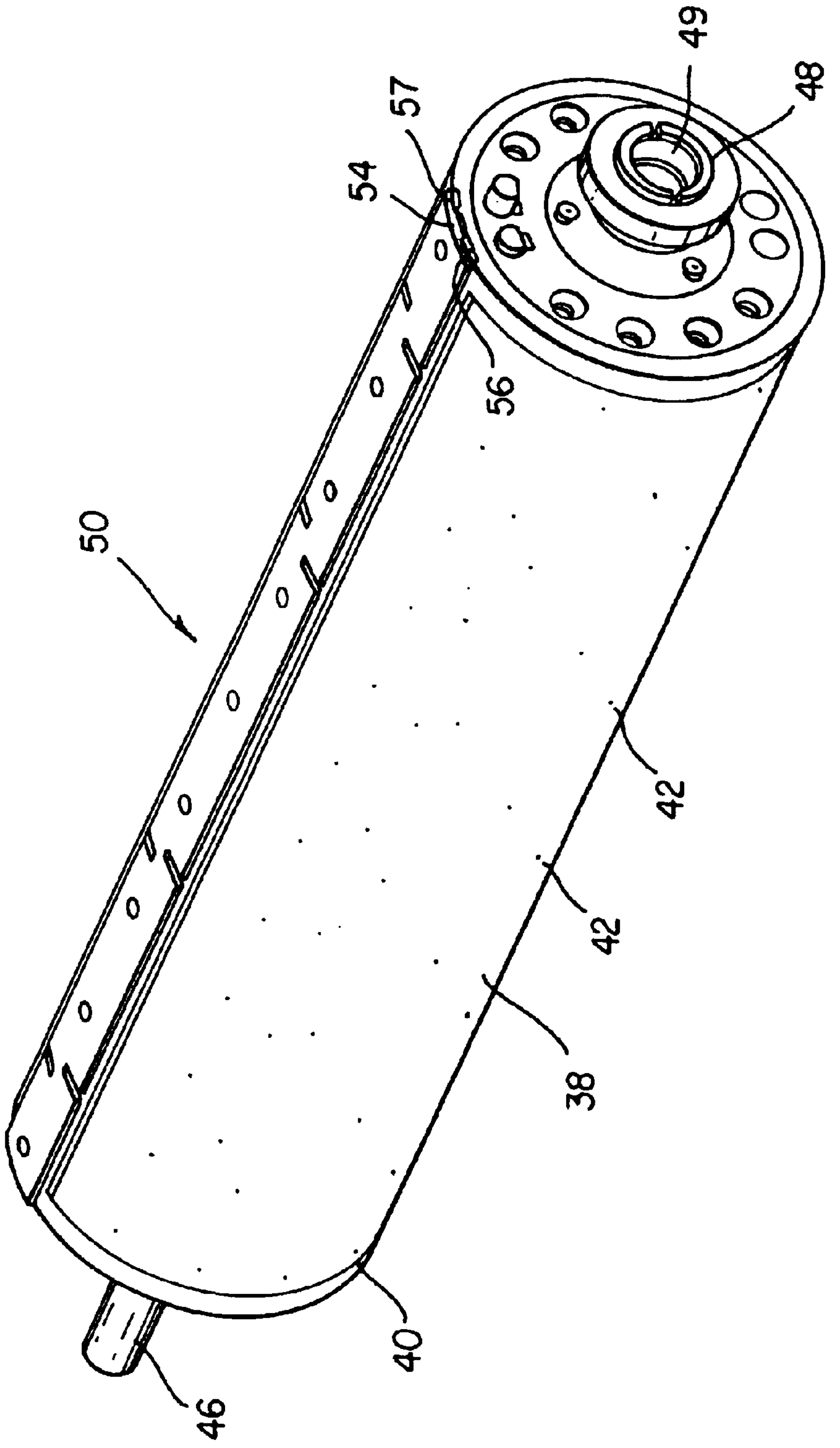
FIG. 12 shows a perspective view of another drum of the present invention having multiple material clamps.
Figure 13:
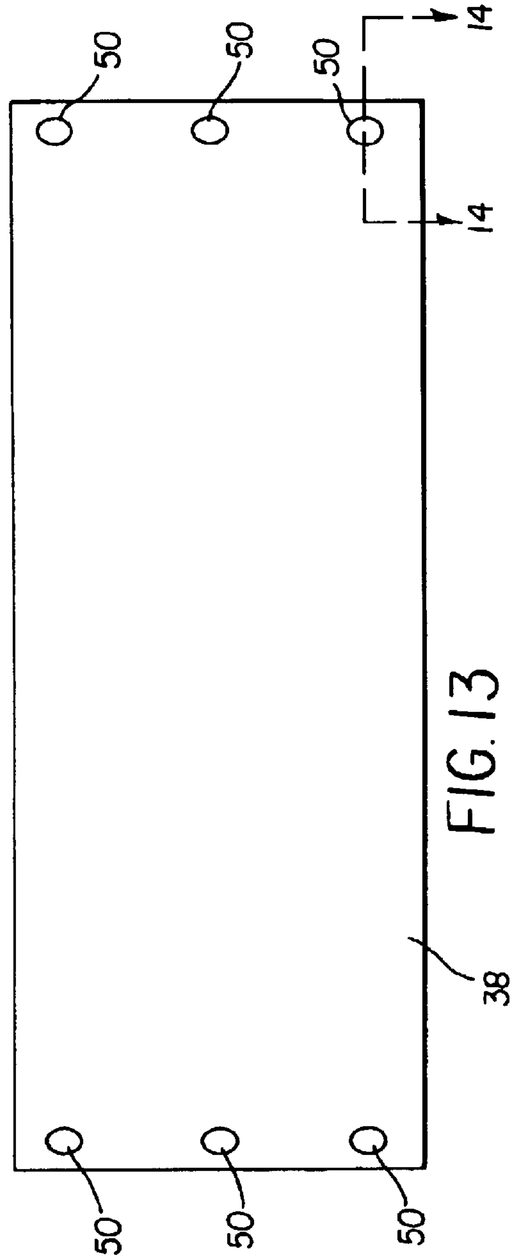
FIG. 13 is a schematic planar view of the surface of the drum of the embodiment of FIG. 12, with multiple material clamp locations designated.
Figure 14:
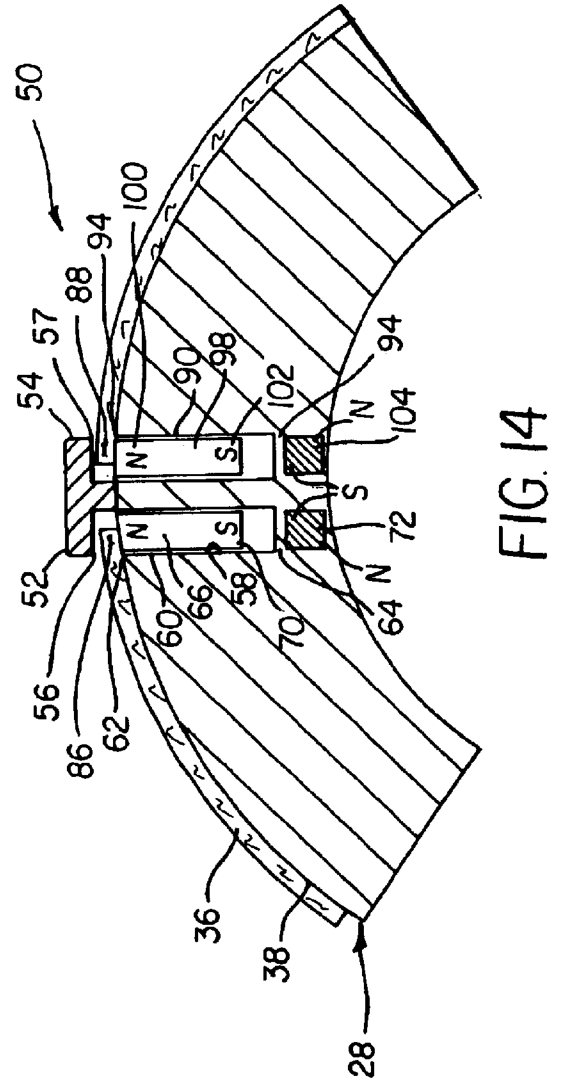
FIG. 14 is a partial cross section view of an embodiment of the vacuum imaging drum of the present invention having plural material clamps.

As is shown in FIGS. 12, 13, and 14, more than one material clamp 50 can be used in conjunction with vacuum imaging drum 28. FIG. 12 shows a perspective view of drum 28 having multiple material clamps. As is shown in this embodiment, retainer 52 comprises a pair of retaining surfaces 56 and 57 supported by a common boss 54. The location of material clamps 50 on drum 28 are shown in FIG. 13 which depicts a planar schematic view of outer surface 38 of imaging drum 28, in which six material clamps 50 are used for capturing a front edge 86 and a rear edge 88 of sheet material 36.

While the material clamps 50 of the present invention are shown in fixed locations on imaging drum 28, it will be appreciated that imaging drum 28 of the present invention can be arranged so that material clamps 50 can be moved to various positions on the circumference of the drum to accommodate different sizes of media. In this regard, imaging drum 28 can provide multiple predefined sites for the location of magnetic clams or can be adaptable to support the custom location of material clamps 50.

FIG. 14 shows a partial cross-section view of outer surface 38 of drum 28 having more than one material clamp 50. As is shown in FIG. 14, drum 28 comprises a recess 58 and a second recess 90. Recesses 58 and 90 have outer ends 60 and 92 respectively at outer surface 38 defining openings 62 and 94 in outer surface 38. Recesses 60 and 90 further comprise inner ends 64 and 96 separated from outer surface 38. Slides 66 and 98 are slidably connected to recesses 58 and 90. Slides 66 and 98 each have a first end 68 and 100 having a first magnetic polarity and a second end 70 and 102 having a second magnetic polarity. The magnetic characteristics of slides 66 and 98 can be created by integrating component magnets (not shown) into slides 66 and 98 or by magnetizing slides 66 and 98.

Drum magnets 72 and 104 are positioned proximate to inner ends 64 and 94 and have a magnetic polarity that is the same as the second magnetic polarity of slides 66 and 98. Thus, drum magnets 72 and 104 repel slides 66 and 92. This biases slides 66 and 98 away from inner ends 64 and 96 toward retaining surfaces 56 and 57. As is shown in FIG. 14, where no sheet material 36 is installed on imaging drum 28, the biasing force is sufficient to propel slides 66 and 92 partially out of recesses 58 and 90 to engage retaining surfaces 56 and 57. In this embodiment, a first end 86 of sheet material 36 can be inserted for example, between slide 66 and retaining surface 56 while a second end is secured between slide 98 and retaining surface 57.

Drum magnets 72 and 104 can be operated in an "open" and "close" state using the structures described above for use in conjunction with a drum 28 having a single material clamp 50. It will also be appreciated that clamps 50 of the drum 30 shown in FIG. 12, 13, or 14 can comprise clamps 50 using a drum magnet 72 to repel slide 66 toward retainer and can be also comprise a clamp 50 using a retainer magnet 67 to urge slide 66 toward retaining surface 56.

Figure 15A:
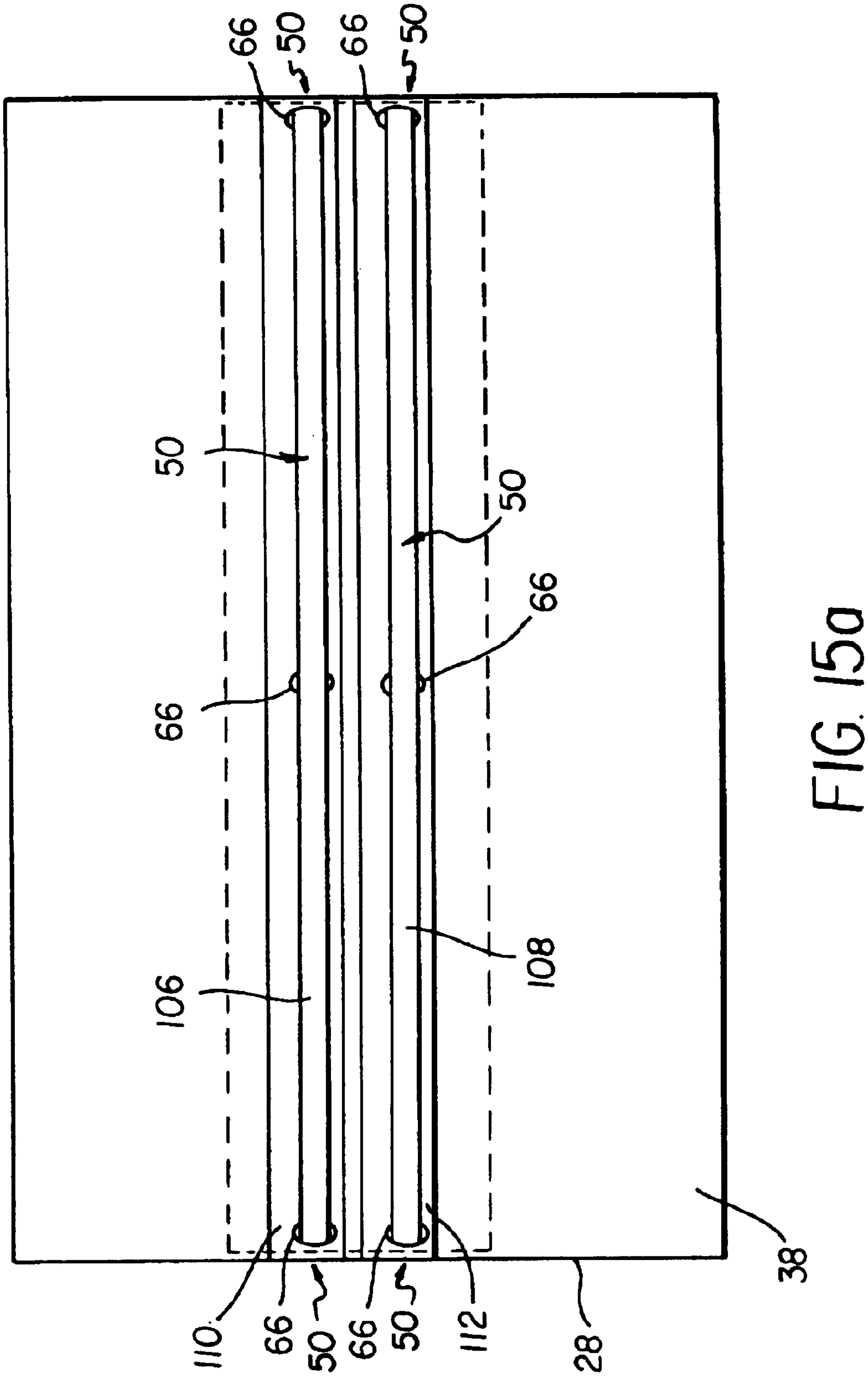
FIG. 15*a* is a top view of an imaging drum having multiple material clamps joined by a contact surface.
Figure 15B:
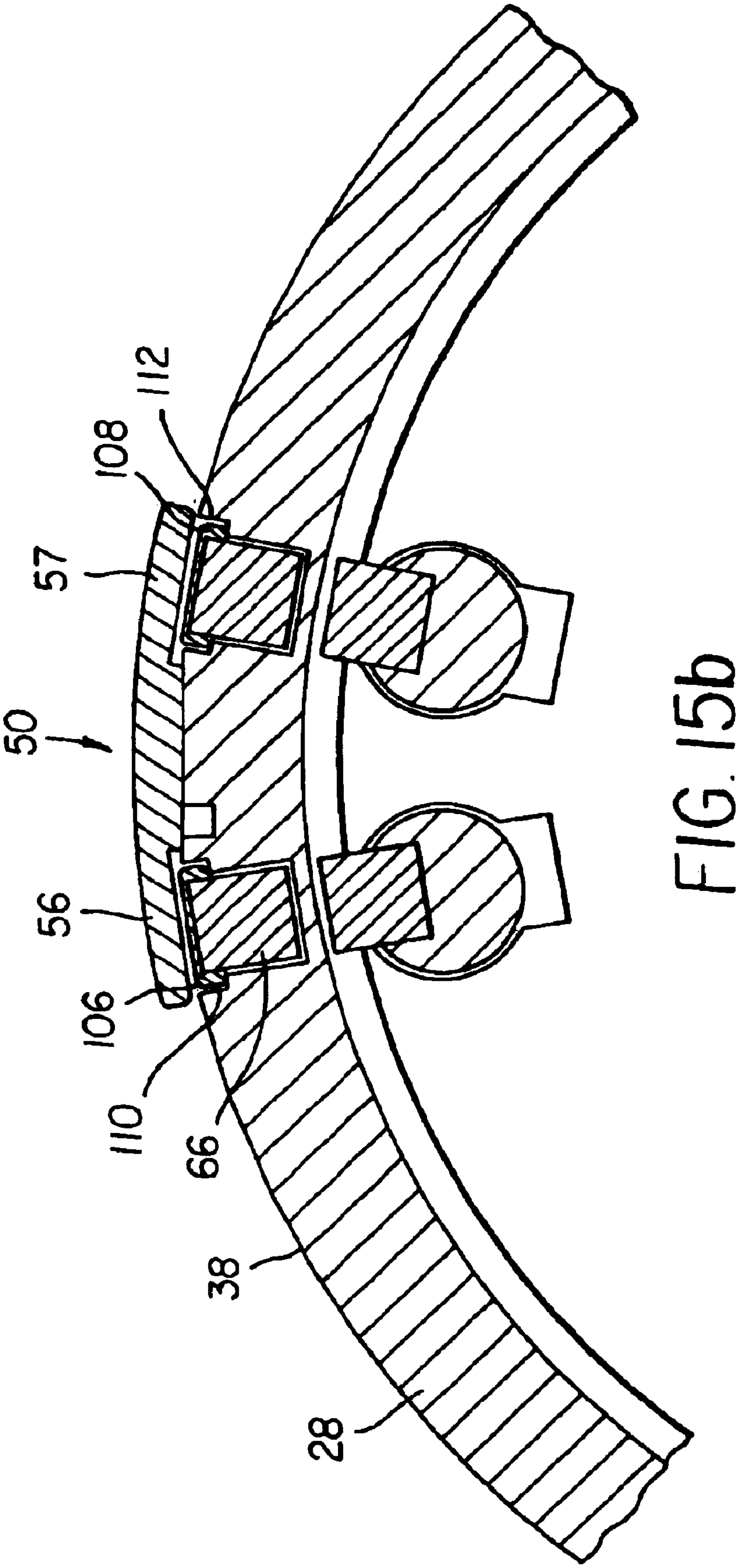
FIG. 15*b* is a cross-section view of an imaging drum having imaging drum having multiple material clamps joined by a contact surface

With respect to any embodiment herein, various surfaces can be used to capture and hold the sheet media in material clamp 50. For example, slide 66 can include a shaped contact surface that spreads the clamping force of slide 66 across the sheet material 36. In this regard, for example, FIGS. 15*a* and 15*b* show a single shaped contact surfaces 106 and 108 are connected across multiple material clamps 50. As is shown in FIG. 15*a*, drum 28 of this embodiment defines common recesses 110 and 112 in outer surface 38. Each recess contains more than one slide, slide 66*a*, 66*b* and 66*c*. Slides 66*a*, 66*b* and 66*c* are joined to and separated by contact surfaces 106 and 108. Contact surfaces 106 and 108 are then biased in the same manner that slides 66*a*, 66*b*, and 66*c* are biased. In this regard, any of the embodiments of material clamp 50 can be used.

Any contact surface of the present invention can be made from a material having a high coefficient of friction including but not limited to a polymeric material. In this regard, contact surfaces 106 and 110 can be made from any number of materials and substances coated, deposited or formed on the surface of any slide or on a separate contact surface. It will be appreciated that the contact surfaces and slides or the present invention can be formed from a common substrate.

The invention has been described in detail with particular reference to certain preferred embodiments thereof, but it will be understood that variations and modifications can be effected within the spirit and scope of the invention.

PARTS LIST

| | |
|---|---|
| 20 | Image processing apparatus |
| 22 | Image processor housing |
| 24 | Sheet material supply assembly |
| 26 | Print head |
| 28 | Imaging drum |
| 29 | Hollowed-out inner portion of drum |
| 30 | Motor |
| 34 | Output Area |
| 36 | Sheet Material |
| 38 | Drum Outer Surface |
| 40 | Vacuum Grooves |
| 42 | Vacuum Holes |
| 44 | Vacuum end plate |
| 46 | Drive spindle |
| 48 | Vacuum Spindle |
| 49 | Central vacuum opening |
| 50 | Material clamp |
| 52 | Retainer |
| 54 | Boss |
| 56 | Retaining Surface |
| 57 | Second Retaining Surface |
| 58 | Recess |
| 60 | Outer End |
| 62 | Opening |

-continued

PARTS LIST

| | |
|---|---|
| 64 | Inner End |
| 66 | Slide |
| 67 | Retainer Magnet |
| 68 | Slide First End |
| 70 | Slide Second End |
| 71 | Power Supply |
| 72 | Drum Magnet |
| 73 | Drum Magnet First End |
| 74 | Cam |
| 75 | Drum Magnet Second End |
| 76 | Second Drum Magnet |
| 77 | Retainer Cam |
| 78 | Slide Bar |
| 80 | Electromagnet |
| 82 | Actuator |
| 84 | Third Magnet |
| 86 | Front Edge of Sheet Material |
| 88 | Rear Edge of Sheet Material |
| 90 | Recess |
| 92 | Outer End |
| 94 | Opening |
| 96 | Inner End |
| 98 | Second Slide |
| 100 | First End of Second Slide |
| 102 | Second End of Second Slide |
| 104 | Second Drum Magnet |
| 106 | Contact Surface |
| 108 | First Recess |
| 110 | Second Recess |
| N | North Magnetic Pole |
| S | South Magnetic Pole |

What is claimed is:

1. An imaging drum assembly for use in an apparatus for forming images on sheet material, comprising:

a rotatable imaging drum having an outer surface spaced from an inner surface to define a thickness, said outer surface further having a recess defined therein extending from an opening at the outer surface toward said inner surface and being configured such that said recess does not extend completely through the thickness to the inner surface;

a material clamp mounted to the drum having a retainer positioning a retaining surface radially outward of the outer surface and forming a space therebetween;

a slide positioned in the recess and movable within the space between an outer radial position where outward radial movement of the slide is blocked by the retaining surface and an inner radial position distant from the retaining surface; and, a magnet having a magnetic field biasing the slide toward the outer radial position;

wherein rotation of the drum creates centrifugal force that further biases the slide toward the outer radial position.

2. The imaging drum assembly of claim 1 wherein the magnetic bias between the magnet and the slide is adjustable between a high level and a lower level.

3. The imaging drum assembly of claim 2 wherein the magnet is an electromagnet.

4. The imaging drum assembly of claim 2 wherein the magnet is movably positioned between a position proximate to the slide and a position that is distant to the slide.

5. The imaging drum assembly of claim 4 wherein the magnet is fixed to a cam to movably position the magnet between the proximate position and the distal position.

6. The imaging drum assembly of claim 4, wherein the magnet is fixed to a slide to movably position the magnet between the proximate position and the distant position.

7. The imaging drum assembly of claim 1 wherein the slide has a magnetic field.

8. The imaging drum assembly of claim 7 wherein the magnet comprises a bipolar magnet having at a first point a magnetic field that is attractive to the magnetic field of the slide and at a second point the magnetic field that repels the slide, wherein the magnet is movably fixed to selectably position the first point and the second point to selectively bias the slide.

9. The imaging drum assembly of claim 8 wherein the magnet is fixed to a cam movably positioning the magnet so that the first point and the second point confront the magnet.

10. The imaging drum assembly of claim 7, further comprising a second magnet having a magnetic field that biases the slide away from the outer radial position and a magnet support to hold the magnet and second magnet, wherein the magnet support is moveable between a first location positioning the magnet proximate to the slide and a second location positioning the second magnet proximate to the slide.

11. The imaging drum assembly of claim 7, further comprising a bar having the magnet with the magnetic field that biases the slide toward the outer radial position and a magnetically attractive material that biases the slide toward the magnetically attractive material, wherein the bar is movable between a first location wherein the magnet is proximate to the slide and a second location wherein the magnetically attractive material is proximate to the slide.

12. The imaging drum assembly of claim 7, wherein the magnet has a magnetic field that repels the magnetic field of the slide and is located proximate to the inner radial position.

13. The imaging drum assembly of claim 12 wherein, the retaining surface comprises a magnetically attractive material and magnetic attraction between the retainer and the slide further biases the slide toward the outer radial position.

14. The imaging drum assembly of claim 1 further comprising a contact surface connected to the slide to engage the sheet material.

15. The imaging drum assembly of claim 14, wherein the contact surface is formed from a polymeric material having a high coefficient of friction.

16. The imaging drum assembly of claim 14 wherein the contact surface comprises a shaped lead-in surface.

17. The imaging drum assembly of claim 1 further comprising more than one material clamp with each clamp having a slide and retainer wherein a common contact surface is fixed between at least two of the slides.

18. An imaging drum assembly, for use in an apparatus for forming images on sheet material, the imaging drum assembly comprising:

- an imaging drum having an outer surface separated from an inner surface to define a thickness, and a recess with the recess having an outer end defining an opening in said outer surface and extending into the drum thickness to an inner end separated from the opening and from the inner surface, with the recess being configured such that the recess does not extend completely through the thickness to the inner surface;
- a boss fixed to the drum and defining a retainer above the recess in the outer surface;
- a slide connected to the recess and moveable between a first position proximate to the retainer and a second position distant from the retainer and comprising a slide magnet with, a first magnetic field; and
- a drum magnet having a repellant magnetic field that biases the slide magnet away from the drum magnet; and the drum magnet being positioned proximate to the inner end of the recess.

19. The imaging drum assembly of claim 18, wherein the drum magnet comprises a bi-polar magnet having at a first end an attractive magnetic field that biases the slide magnet toward the bi-polar drum magnet and at a second end the repellant magnetic field that biases the slide magnet away from the bi-polar drum magnet and wherein a magnet support movably locates the bi-polar drum magnet between a first location wherein the first end of the bi-polar magnet is proximate to the inner end of the recess and a second location wherein the second end of the bi-polar magnet proximate to the inner end of the recess.

20. The imaging drum assembly of claim 19, wherein the magnet support comprises a cam to controllably position the bi-polar magnet to attract and repel the slide magnet.

21. The imaging drum assembly of claim 18, further comprising a magnet support for supporting the drum magnet, wherein the magnet support comprises a movable bar to selectively position the drum magnet between a first location proximate to the inner end of the recess and a second location distant to the recess.

22. The imaging drum assembly of claim 21, wherein the bar further comprises a magnetically attractive material and the bar is moveable between a first position that dispose the drum magnet proximate to the inner end of the recess to repel the slide magnet and a second position that disposes the magnetically attractive material proximate to the inner end of the recess to attract the slide magnet.

23. The imaging drum assembly of claim 18, further comprising a contact surface connected to the slide to engage the sheet material.

24. The imaging drum assembly of claim 23, wherein the contact surface is formed from a polymeric material having a high coefficient of friction.

25. The imaging drum assembly of claim 23, wherein the contact surface comprises a shaped lead-in surface.

26. An imaging apparatus for forming images on sheet material: the imaging apparatus comprising:

- a print head for forming images on the sheets;
- a rotatable imaging drum having an outer surface spaced from an inner surface to define a thickness, said drum having a slide channel defined therein said slide channel extending from an opening at the outer surface toward said inner surface and being configured such that the slide channel does not extend completely through the thickness to the inner surface to form a closed end within the thickness;
- a motor for rotating the imaging drum;
- a material clamp mounted to the drum having
  - a retainer positioning a retaining surface radially outward of the outer surface and forming a space therebetween;
  - a slide movable within the space between an outer radial position where outward radial movement of the slide is blocked by the retaining surface and an radial position distant from the retaining surface where the slide engages the closed end; and,
- a magnet having a magnetic field biasing the slide toward the outer radial position;

wherein rotation of the drum creates centrifugal force that further biases the slide toward the outer radial position.

27. The imaging apparatus of claim 26 wherein the magnetic bias between the magnet and the slide is adjustable between a high level and a lower level.

28. The imaging apparatus of claim 27 wherein the magnet is an electromagnet.

29. The imaging apparatus of claim 27 wherein the magnet is movably positioned between a position proximate to the slide and a position that is distant to the slide.

30. The imaging apparatus of claim 29 wherein the magnet is fixed to a cam to movably position the magnet between the proximate position and the distant position.

31. The imaging apparatus of claim 30, wherein the magnet is fixed to a slide to movably position the magnet between the proximate position and the distant position.

32. The imaging apparatus of claim 26 wherein the slide has a magnetic field.

33. The imaging apparatus of claim 32 wherein the magnet comprises a bipolar magnet having at a first point a magnetic field that is attractive to the magnetic field of the slide and at a second point the magnetic field that repels the slide, wherein the magnet is movably fixed to selectably position the first point and the second point to selectively bias the slide.

34. The imaging apparatus of claim 33 wherein the magnet is fixed to a cam movably positioning the magnet so that the first point and the second point confront the magnet.

35. The imaging apparatus of claim 32, further comprising a second magnet having a magnetic field that biases the slide away from the outer radial position and a magnet support to hold the magnet and second magnet, wherein the magnet support is moveable between a first location positioning the magnet proximate to the slide and a second location positioning the second magnet proximate to the slide.

36. The imaging apparatus of claim 32, further comprising a bar having the magnet with the magnetic field that biases the slide toward the outer radial position and a magnetically attractive material, wherein the bar is movable between a first location wherein the magnet is proximate to the slide and a second location wherein the magnetically attractive material is proximate to the slide.

37. The imaging apparatus of claim 32, wherein the magnet has a magnetic field that repels the magnetic field of the slide and is located proximate to the radial position.

38. The imaging apparatus of claim 37 wherein, the retaining surface comprises a magnetically attractive material, and magnetic attraction between the retainer and the slide further biases the slide toward the radial position.

39. The imaging apparatus of claim 26 further comprising a contact surface connected to the slide to engage the sheet material.

40. The imaging apparatus of claim 39, wherein the contact surface formed from a polymeric material having a high coefficient of friction.

41. The imaging apparatus of claim 39 wherein the contact surface comprises a shaped lead-in surface.

42. The imaging apparatus of claim 26 further comprising more than one material clamp with each clamp having a slide and retainer wherein a common contact surface is fixed between at least two of the slides.

43. The imaging apparatus of claim 26 further comprising an electromagnet spaced apart from the drum to bias the slide away from the outer radial position.

44. The imaging apparatus of claim 26 further comprising a mechanical actuator spaced apart for controllably positioning a third magnet proximate between a first position that is proximate to the drum and a second position that is distant from the drum, wherein the third magnet biases the slide away from the retaining surface.

45. An imaging apparatus, for use in an apparatus for forming images on sheet material, the imaging apparatus comprising:

a rotatable imaging drum having an outer surface spaced from an inner surface to define a thickness, said outer surface having a recess with an outer end defining an opening in said outer surface and extending toward said inner surface to an inner end separated from the opening and being configured such that said recess does not extend completely through the thickness to the inner surface;

a boss fixed to the drum and defining a retainer above the recess in the outer surface;

a slide connected to the recess and moveable between a first position proximate to the retainer and a second position distant from the retainer and comprising a slide magnet with a first magnetic field;

a drum magnet having a repellant magnetic field that biases the slide magnet away from the drum magnet; and, a magnet support positioning the drum magnet proximate to the inner end of the recess.

46. The imaging apparatus of claim 45, wherein the drum magnet comprises a bi-polar magnet having at a first end an attractive magnetic field that biases the slide magnet toward the bi-polar drum magnet and at a second end the repellant magnetic field that biases the slide magnet away from the bi-polar drum magnet and wherein the magnet support movably locates the bi-polar drum magnet between a first location wherein the first end of the bi-polar magnet is proximate to the inner end of the recess and a second location wherein the second end of the bi-polar magnet proximate to the inner end of the recess.

47. The imaging apparatus of claim 45, wherein the magnet support comprises a cam to controllably position the bi-polar magnet to attract and repel the slide magnet.

48. The imaging apparatus of claim 45, wherein the magnet support comprises a movable bar to selectively position the drum magnet between a first location proximate to the inner end of the recess and a second location distant to the recess.

49. The imaging apparatus of claim 48, wherein the bar further comprises a magnetically attractive material and the bar is moveable between a first position that dispose the drum magnet proximate to the inner end of the recess to repel the slide magnet and a second position that disposes the magnetically attractive material proximate to the inner end of the recess to attract the slide magnet.

50. The imaging apparatus of claim 45 further comprising a contact surface connected to the slide to engage the sheet material.

51. An imaging drum assembly for use in an imaging apparatus for forming images on sheet material; the imaging drum assembly comprising:

a rotatable imaging drum having an outer surface spaced from an inner surface to define a thickness, said drum further having a slide channel defined therein, said slide channel extending from opening at the outer surface toward said inner surface and being configured such that said slide channel does not extend completely through the thickness to the inner surface;

a retainer positioning a retaining surface radially outward of the opening of the slide channel at the outer surface and forming a space therebetween; and a slide positioned in the slide channel, with the slide being movable within the space between an outer radial position where outward radial movement of the slide is blocked by the retaining surface and an inner radial position distant from the retaining surface;

wherein rotation of the drum creates centrifugal force that biases the slide toward the outer radial position.

52. The imaging drum of claim 51 wherein said outer surface is adapted to apply a vacuum to attract sheet material.

53. The imaging drum of claim 51 wherein outer surface is electrostatically charged to attract sheet material to the drum.

54. The imaging drum of claim 51 further comprising a contact surface connected to the slide to engage the sheet material.

55. The imaging drum of claim 54, wherein the contact surface is formed from a polymeric material having a high coefficient of friction.

56. The imaging drum assembly of claim 54, wherein the contact surface comprises a shaped lead-in surface.

57. The imaging drum assembly of claim 51, further comprising more than one material clamp with each clamp having a slide and retainer wherein a common contact surface is fixed between at least two of the slides.

58. An imaging drum assembly for use in an imaging apparatus for forming images on sheet material; the imaging drum assembly comprising:

a rotatable imaging drum having an outer surface spaced from an inner surface to define a thickness, said drum further having a slide channel defined therein extending from an opening at said outer surface toward said inner surface and being configured such that said slide channel does not extend completely through the thickness to the inner surface;

a retainer positioning a retaining surface radially outward of the opening in the outer surface and forming a space therebetween and a slide positioned in the slide channel and movable within the space between an outer radial position where outward radial movement of the slide is blocked by the retaining surface and an inner radial position distant from the retaining surface; and;

a biasing member urging the slide toward the outer radial position.

59. The imaging drum of claim 58 wherein said biasing member comprises a compression spring.

60. The imaging drum of claim 58 wherein the biasing member comprises a magnet generating a magnetic field that biases the slide toward the outer position.

61. The imaging drum assembly of claim 60, wherein the magnetic bias between the magnet and the slide is adjustable between a high level and a lower level.

62. The imaging drum assembly of claim 61 wherein the magnet is an electromagnet.

63. The imaging drum assembly of claim 61 wherein the magnet is movably positioned between a position proximate to the slide and a position that is distant to the slide.

64. The imaging drum assembly of claim 63 wherein the magnet is fixed to a cam to movably position the magnet between the proximate position and the distant position.

65. The imaging drum assembly of claim 63, wherein the magnet is fixed to a slide to movably position the magnet between the proximate position and the distant position.

66. The imaging drum assembly of claim 61 wherein the slide has a magnetic field.

67. The imaging drum assembly of claim 66 wherein the magnet comprises a bipolar magnet having at a first point a magnetic field that is attractive to the magnetic field of the slide and at a second point the magnetic field that repels the slide, wherein the magnet is movably fixed to selectably position the first point and the second point to selectively bias the slide.

68. The imaging drum assembly of claim 67 wherein the magnet is fixed to a cam movably positioning the magnet so that the first point and the second point confront the magnet.

69. The imaging drum assembly of claim 66, further comprising a second magnet having a magnetic field that biases the slide away from the outer radial position and a magnet support to hold the magnet and second magnet, wherein the magnet support is moveable between a first location positioning the magnet proximate to the slide and a second location positioning the second magnet proximate to the slide.

70. The drum assembly of claim 66, further comprising a bar having the magnet with the magnetic field that biases the slide toward the outer radial position and a magnetically attractive material that biases the slide toward the magnetically attractive material, wherein the bar is movable between a first location wherein the magnet is proximate to the slide and a second location wherein the magnetically attractive material is proximate to the slide.

71. The imaging drum assembly of claim 66, wherein the magnet has a magnetic field that repels the magnetic field of the slide and is located proximate to the inner radial position.

72. The imaging drum assembly of claim 66, wherein, the retaining surface comprises a magnetically attractive material, and magnetic attraction between the retainer and the slide further biases the slide toward the outer radial position.

73. The imaging drum assembly of claim 58 further comprising a contact surface connected to the slide to engage the sheet material.

74. The imaging drum assembly of claim 73, wherein the contact surface is formed from a polymeric material having a high coefficient of friction.

75. The imaging drum assembly of claim 73 wherein the contact surface comprises a shaped lead-in surface.

76. The imaging drum assembly of claim 58 further comprising more than one material clamp with each clamp having a slide and retainer wherein a common contact surface is fixed between at least two of the slides.

* * * * *

UNITED STATES PATENT AND TRADEMARK OFFICE

CERTIFICATE OF CORRECTION

PATENT NO. : 6,729,235 B2 
DATED : May 4, 2004
INVENTOR(S) : Roger S. Kerr

It is certified that error appears in the above-identified patent and that said Letters Patent is hereby corrected as shown below:

Column 14,
Line 54, insert -- inner -- before "radial"

Column 15,
Lines 36 and 40, insert -- inner -- before "radial"
Line 45, insert -- is -- before "formed"

Column 16,
Line 51, insert -- an -- before "opening"

Column 18,
Line 23, insert -- imaging -- before "drum"

Signed and Sealed this

Tenth Day of August, 2004

JON W. DUDAS
*Acting Director of the United States Patent and Trademark Office*